United States Patent [11] 3,592,326

[72] Inventors Donald F. Zimmerle
Dayton;
Horace W. Weeks, Bellbrook; Robert E.
Fischer, Dayton, all of, Ohio
[21] Appl. No. 795,588
[22] Filed Jan. 31, 1969
[45] Patented July 13, 1971
[73] Assignee The National Cash Register Company
Dayton, Ohio

[54] PARCEL POST SINGULATING AND ORIENTING APPARATUS
26 Claims, 25 Drawing Figs.

[52] U.S. Cl. .................................................. 198/33 R
[51] Int. Cl. .................................................. B65g 37/00
[50] Field of Search .......................................... 198/DIG.
16, 33, 33 R

[56] References Cited
UNITED STATES PATENTS
2,895,588 7/1959 Van Marle .................... 198/33 (R1)
2,914,161 11/1959 Black, Jr. et al. ............. 198/33 (R1)
2,973,608 3/1961 Killion ........................... 198/33(R2)X
2,997,187 8/1961 Burt ............................... 198/33 (R2) X
3,085,696 4/1963 Stainforth et al. ............. 198/33 (R2) X
3,128,868 4/1964 Bowen ........................... 198/33 (R2)

FOREIGN PATENTS
675,556 7/1952 Great Britain ................. 198/33 (R3)

Primary Examiner—Gerald M. Forlenza
Assistant Examiner—Frank E. Werner
Attorneys—Louis A. Kline, Albert L. Sessler and Elmer Wargo ABSTRACT: A singulating and orienting apparatus for handling a plurality of multisided items, with each item having an identifiable mark (a special stamp) located in one quadrant on one side thereof. The apparatus includes a plurality of conveyors designed to singulate or space the items along a main conveyor belt. Scanning means are used to search for the identifiable mark as the items are moved on said main belt. Conveyor-type manipulating means acting under control of signals from the scanning means rotate the items about their own horizontal and vertical axes, if necessary, so as to orient the side containing the mark in a predetermined orientation on the main belt. Optical quadrature scanning means then search the oriented side to locate the mark in a particular quadrant thereon, and, thereafter, the item is rotated about its horizontal axis, if necessary, to position the quadrant containing the mark in a particular orientation on the main belt. The scanning means are operated in "phosphorescent" and "fluorescent" modes to detect the identifiable mark.

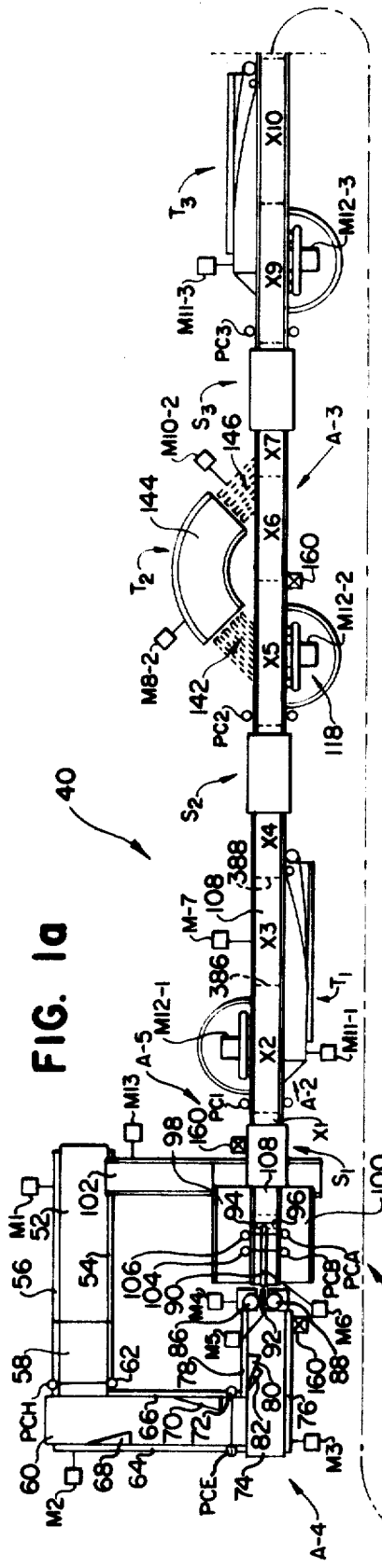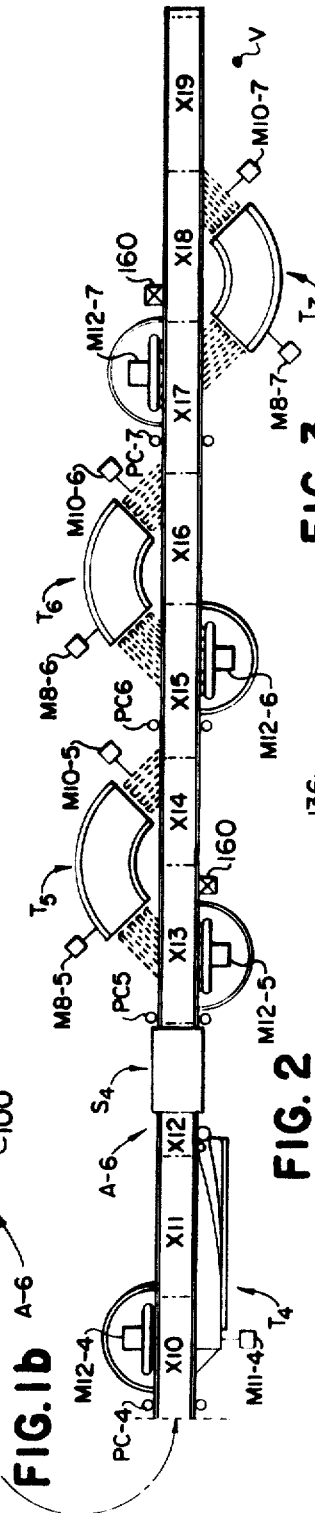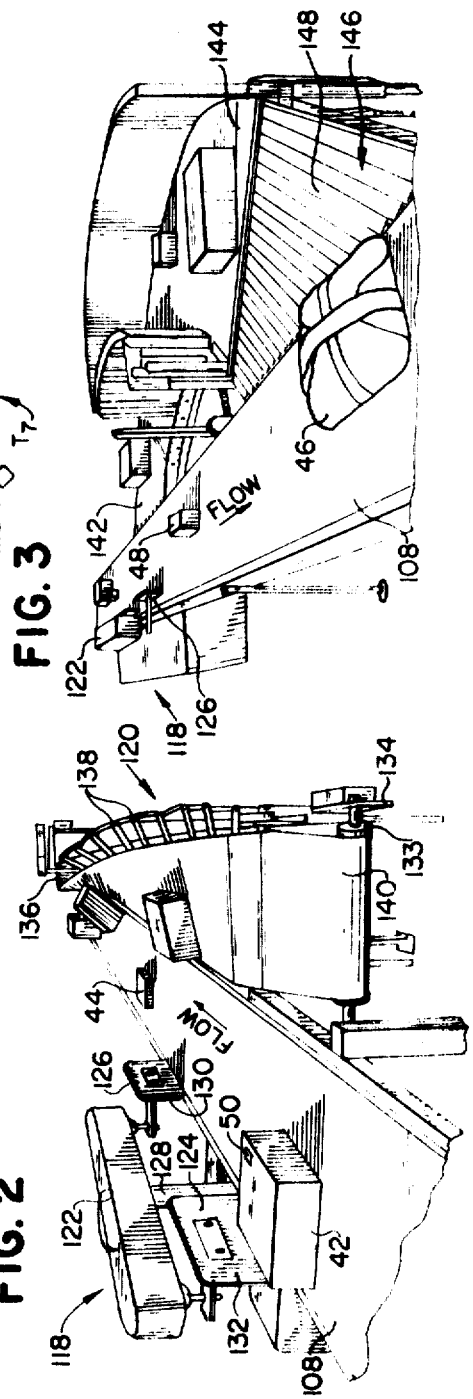
FIG. 1a
FIG. 1b
FIG. 2
FIG. 3
INVENTORS
DONALD F. ZIMMERLE,
HORACE W. WEEKS &
ROBERT E. FISCHER
THEIR ATTORNEYS

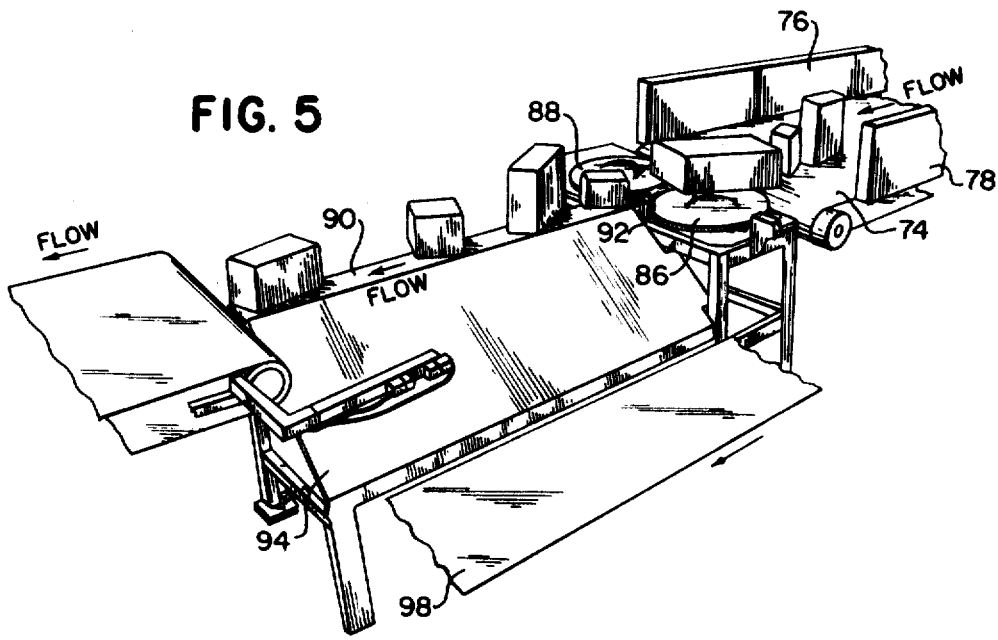
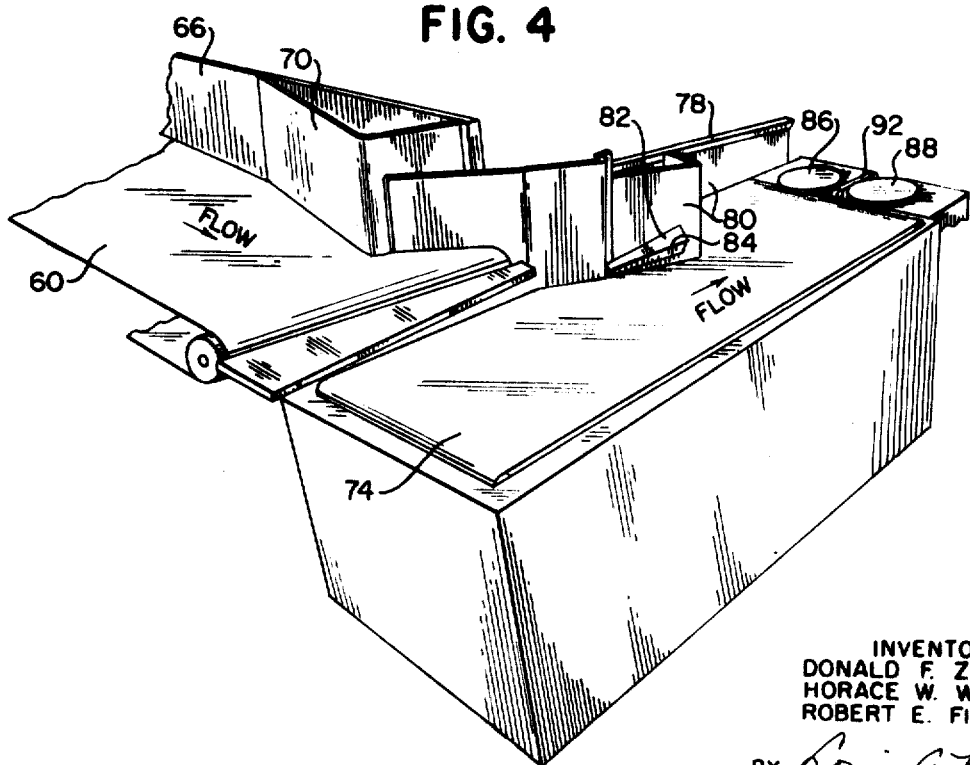

PATENTED JUL 13 1971

INVENTORS
DONALD F. ZIMMERLE,
HORACE W. WEEKS &
ROBERT E. FISCHER

BY Louis A. Kline
Albert L. Ely
Elmer Wargo
THEIR ATTORNEYS

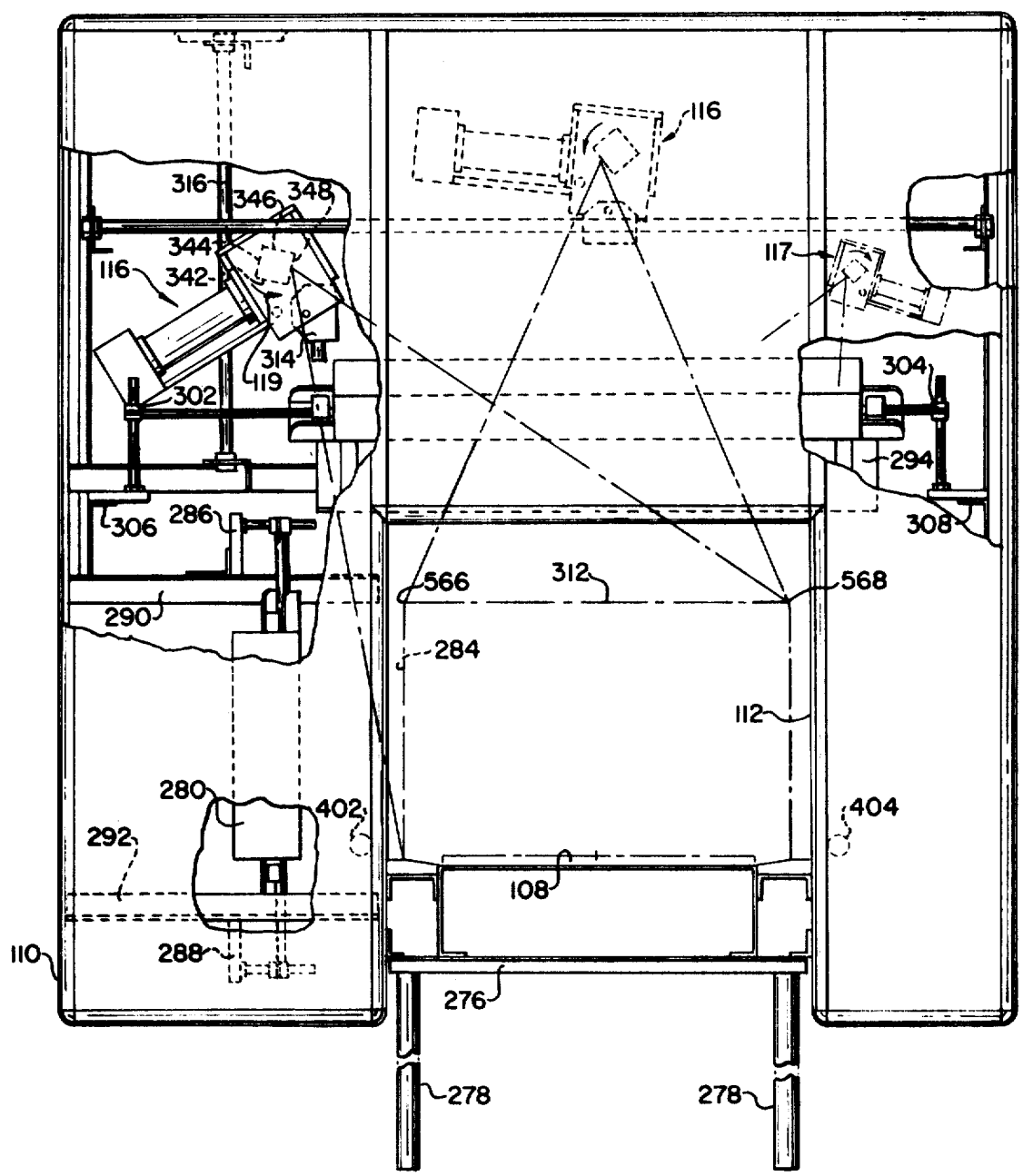

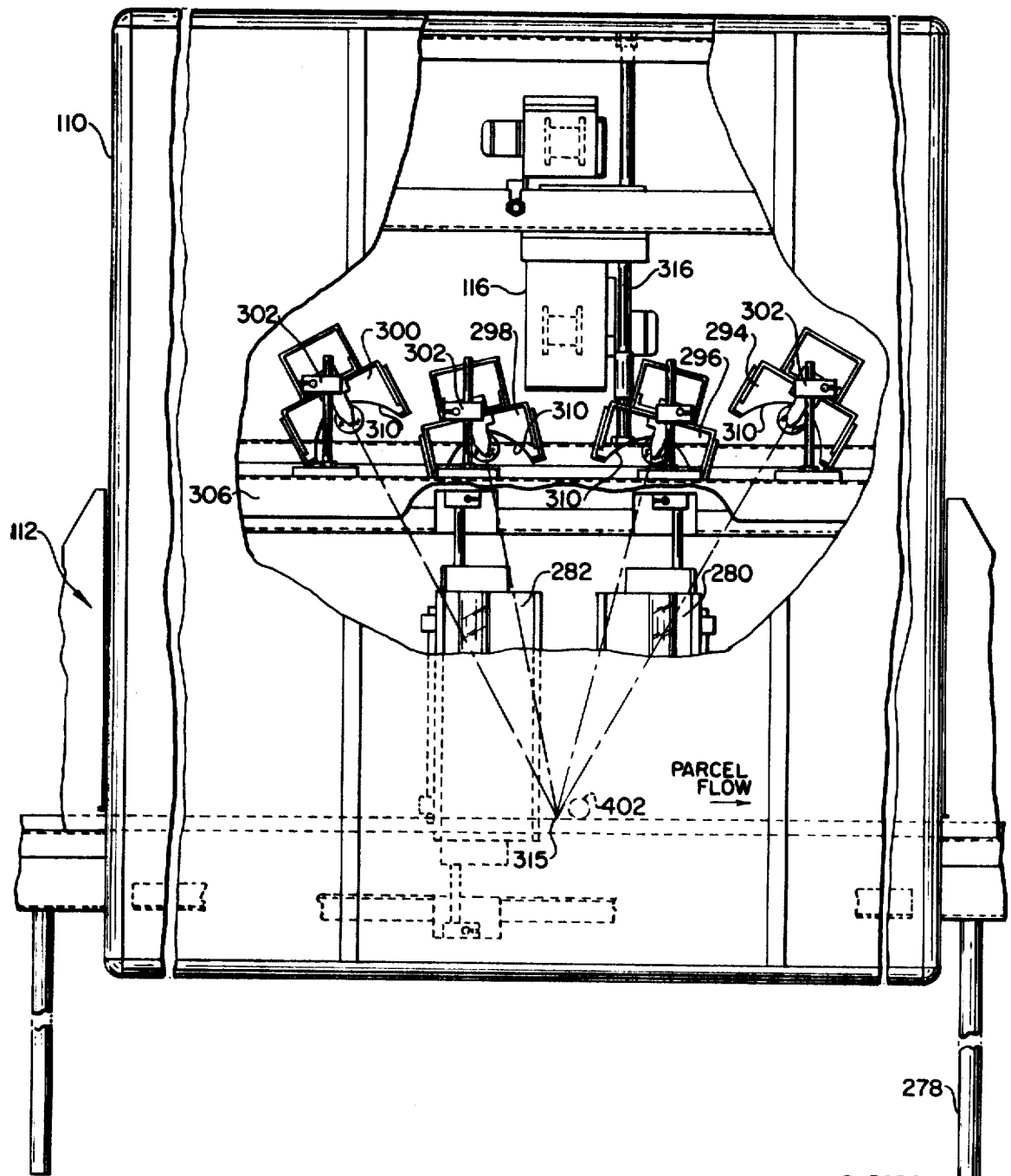

FIG. 12

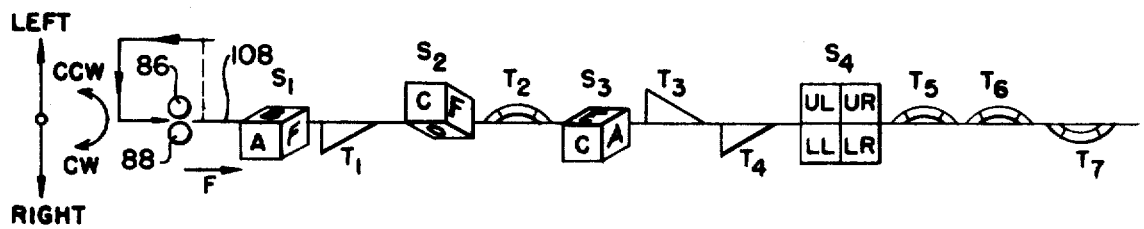

FIG. 13

| TRUTH TABLE | | | | | | $S_1$ | | | | $\bar{S}_1$ | | | |
|---|---|---|---|---|---|---|---|---|---|---|---|---|---|
| | | $S_1$ | | $\bar{S}_1$ | | $S_2$ | | $\bar{S}_2$ | | $S_2$ | | $\bar{S}_2$ | |
| PARCEL SIDE | $S_1$ | $S_2$ | $\bar{S}_2$ | $S_2$ | $\bar{S}_2$ | $S_3$ | $\bar{S}_3$ | $S_3$ | $\bar{S}_3$ | $S_3$ | $\bar{S}_3$ | $S_3$ | $\bar{S}_3$ |
| A | 1 | 1 | 0 | 0 | 0 | 1 | 0 | 0 | 0 | 0 | 0 | 0 | 0 |
| B | 1 | 0 | 1 | 0 | 0 | 0 | 0 | 1 | 0 | 0 | 0 | 0 | 0 |
| C | 0 | 0 | 0 | 1 | 0 | 0 | 0 | 0 | 0 | 1 | 0 | 0 | 0 |
| D | 0 | 0 | 0 | 1 | 0 | 0 | 0 | 0 | 0 | 0 | 1 | 0 | 0 |
| E | 0 | 0 | 0 | 0 | 1 | 0 | 0 | 0 | 0 | 0 | 0 | 1 | 0 |
| F | 0 | 0 | 0 | 0 | 1 | 0 | 0 | 0 | 0 | 0 | 0 | 0 | 1 |

| LOGIC EQUATIONS |
|---|
| 1. $S_1 = A + B$ |
| 2. $T_1 = \bar{S}_1 = \bar{A}\bar{B}\bar{L}_{36}$ |
| 3. $S_2 = (A+C) + (C+D)$ $= A + C + D$ |
| 4. $T_2 = \bar{S}_1 \bar{S}_2$ $= \bar{A}\bar{B}\bar{C}\bar{D}\bar{L}_{20}$ |
| 5. $S_3 = A + B + C + E$ |
| 6. $T_3 = S_1 \bar{S}_2 S_3 + \bar{S}_1 \bar{S}_2 S_3$ $= \bar{S}_2 S_3 = (B + E)\bar{L}_{36}$ |
| 7. $T_4 = \bar{S}_1 S_2 \bar{S}_3 + \bar{S}_1 \bar{S}_2 \bar{S}_3$ $= \bar{S}_2 \bar{S}_3 = (D + F)\bar{L}_{36}$ |
| 8. $T_5 = (UL + LL)\bar{L4}_{20}$ |
| 9. $T_6 = (LL)\bar{L4}_{20}$ |
| 10. $T_7 = (LR) L4_{20}$ |

| MINIMUM CONDITION EQUATIONS |
|---|
| 11. $A = S_1 S_2$ |
| 12. $B = S_1 \bar{S}_2$ |
| 13. $C = \bar{S}_1 S_2 S_3$ |
| 14. $D = \bar{S}_1 S_2 \bar{S}_3$ |
| 15. $E = \bar{S}_1 \bar{S}_2 S_3$ |
| 16. $F = \bar{S}_1 \bar{S}_2 \bar{S}_3$ |

INVENTORS
DONALD F. ZIMMERLE,
HORACE W. WEEKS &
ROBERT E. FISCHER

BY

THEIR ATTORNEYS

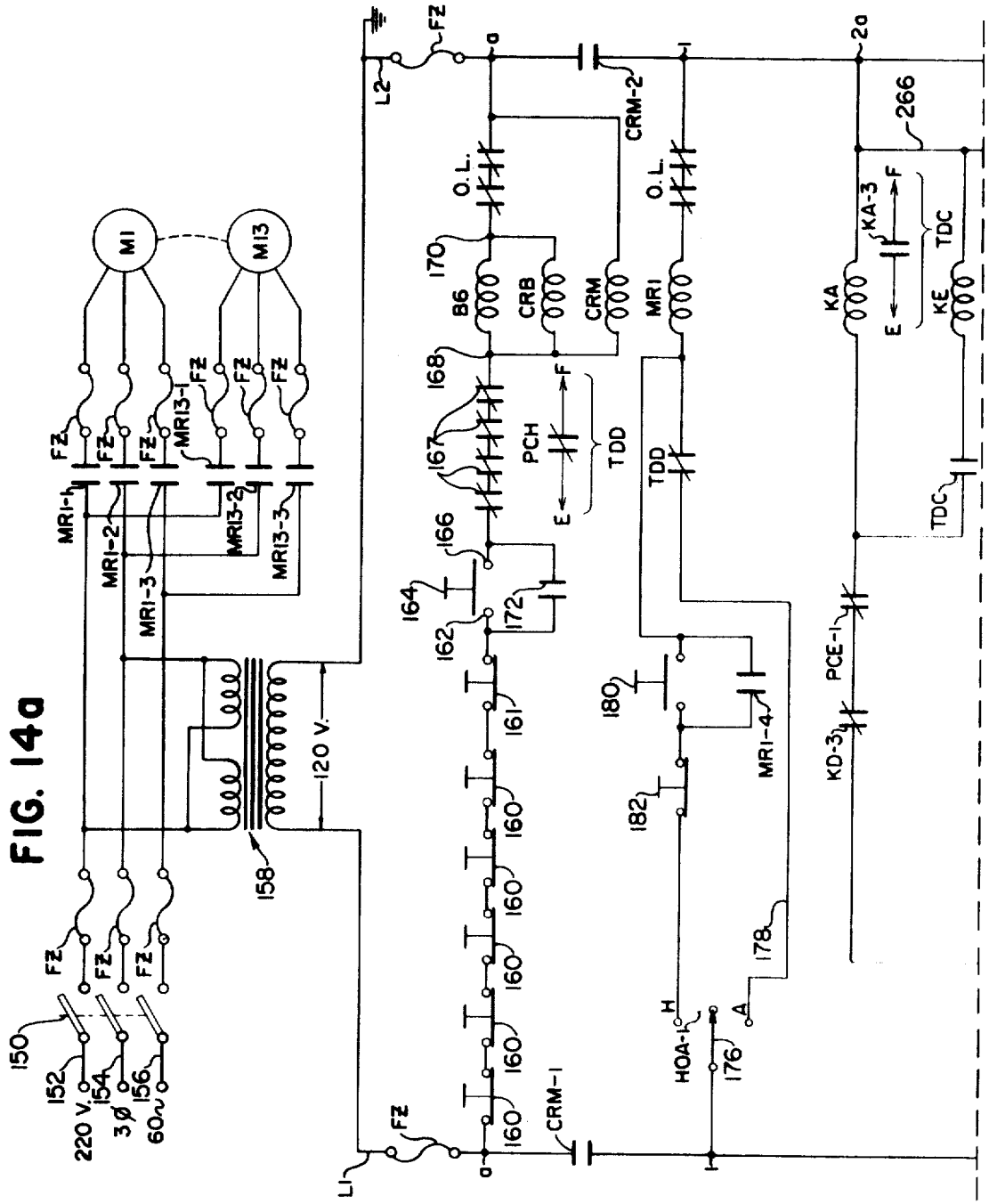

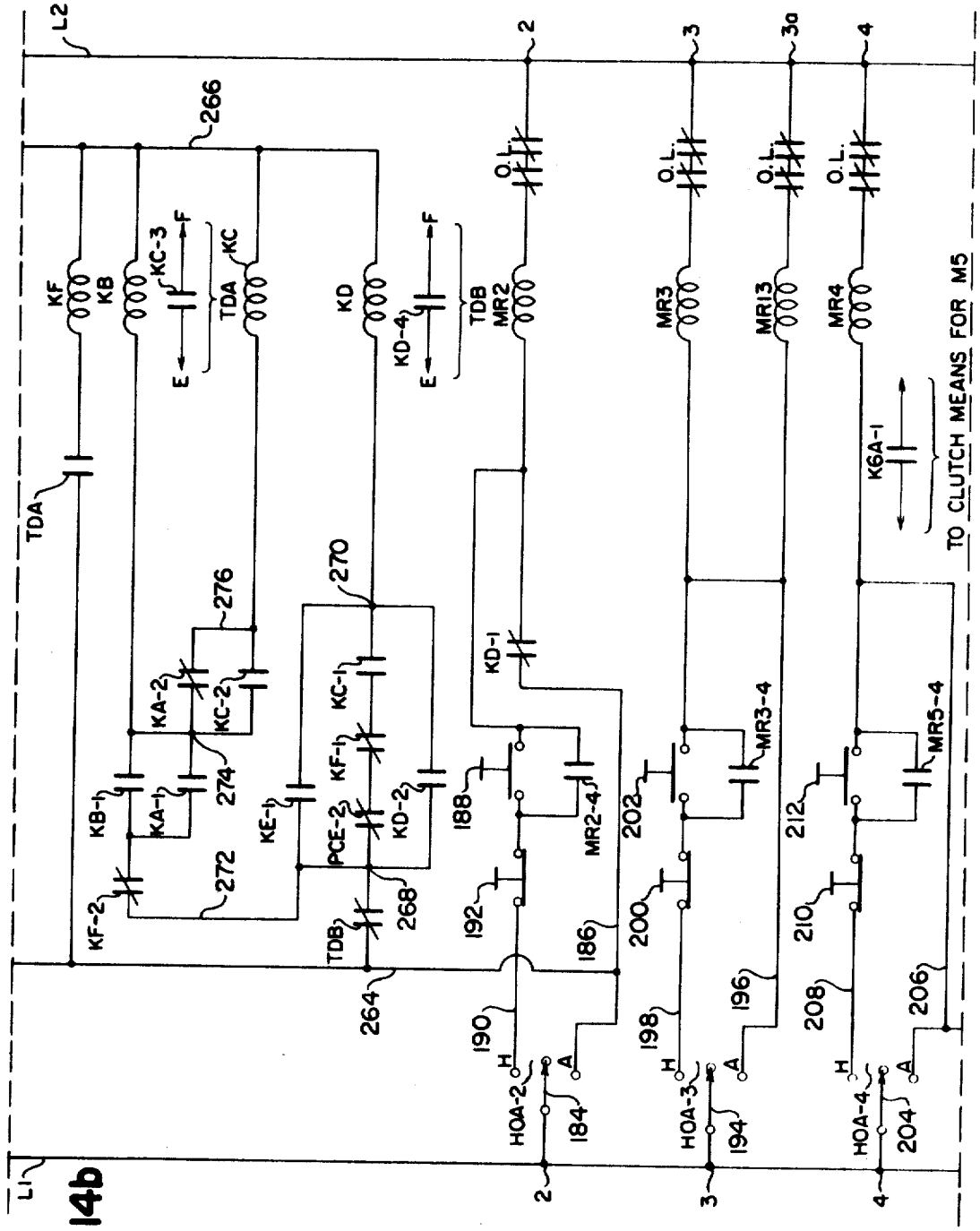

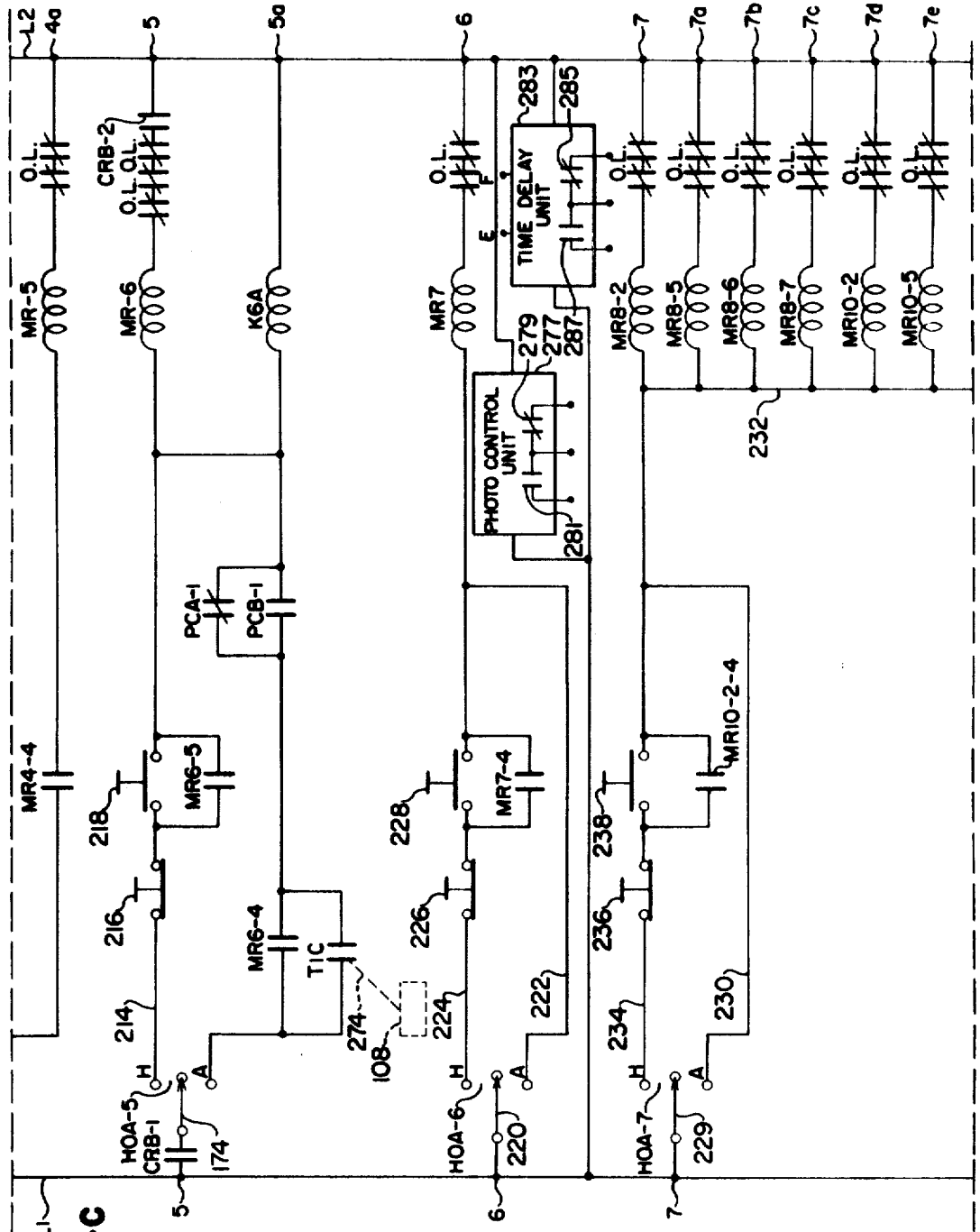

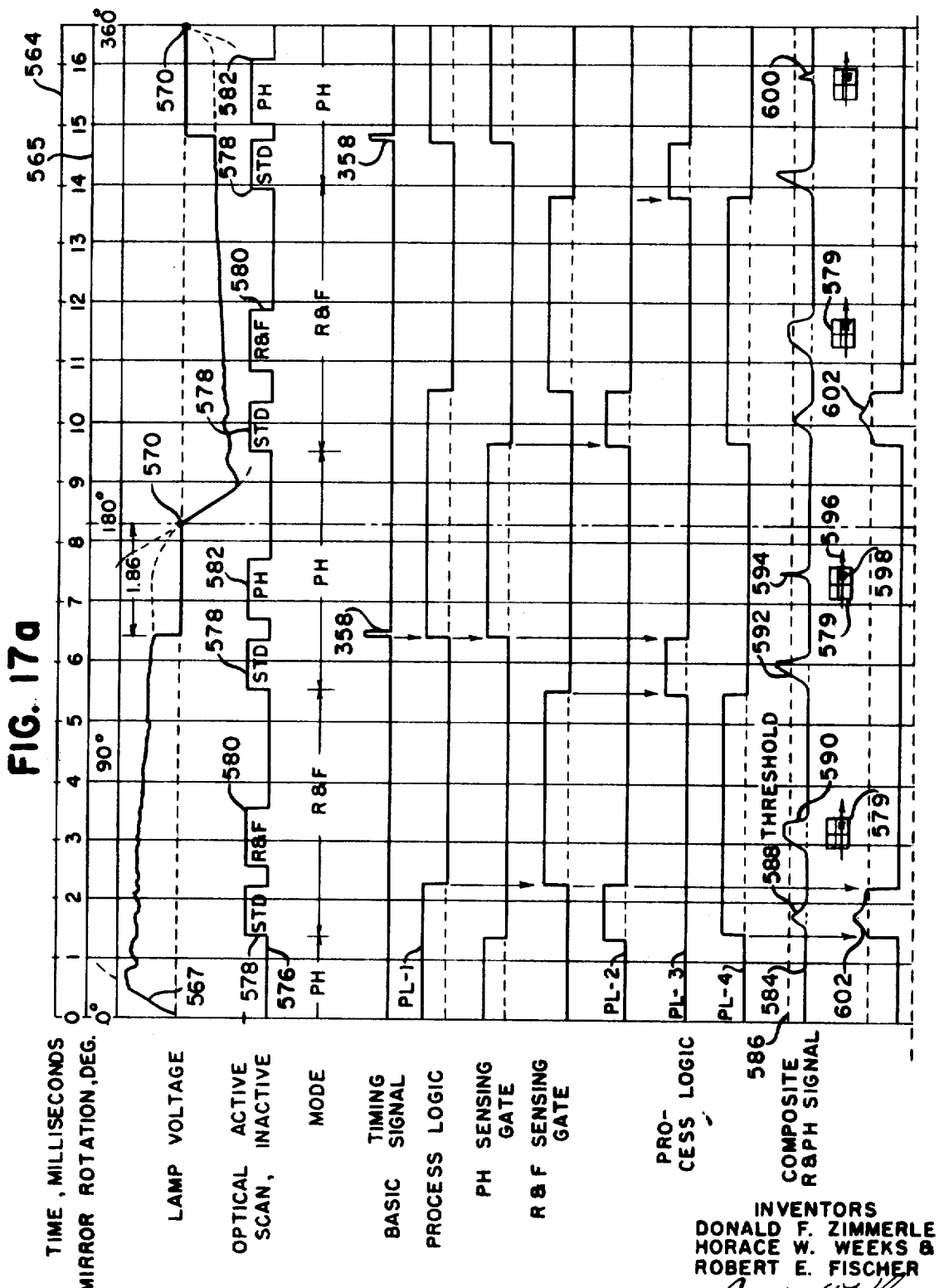

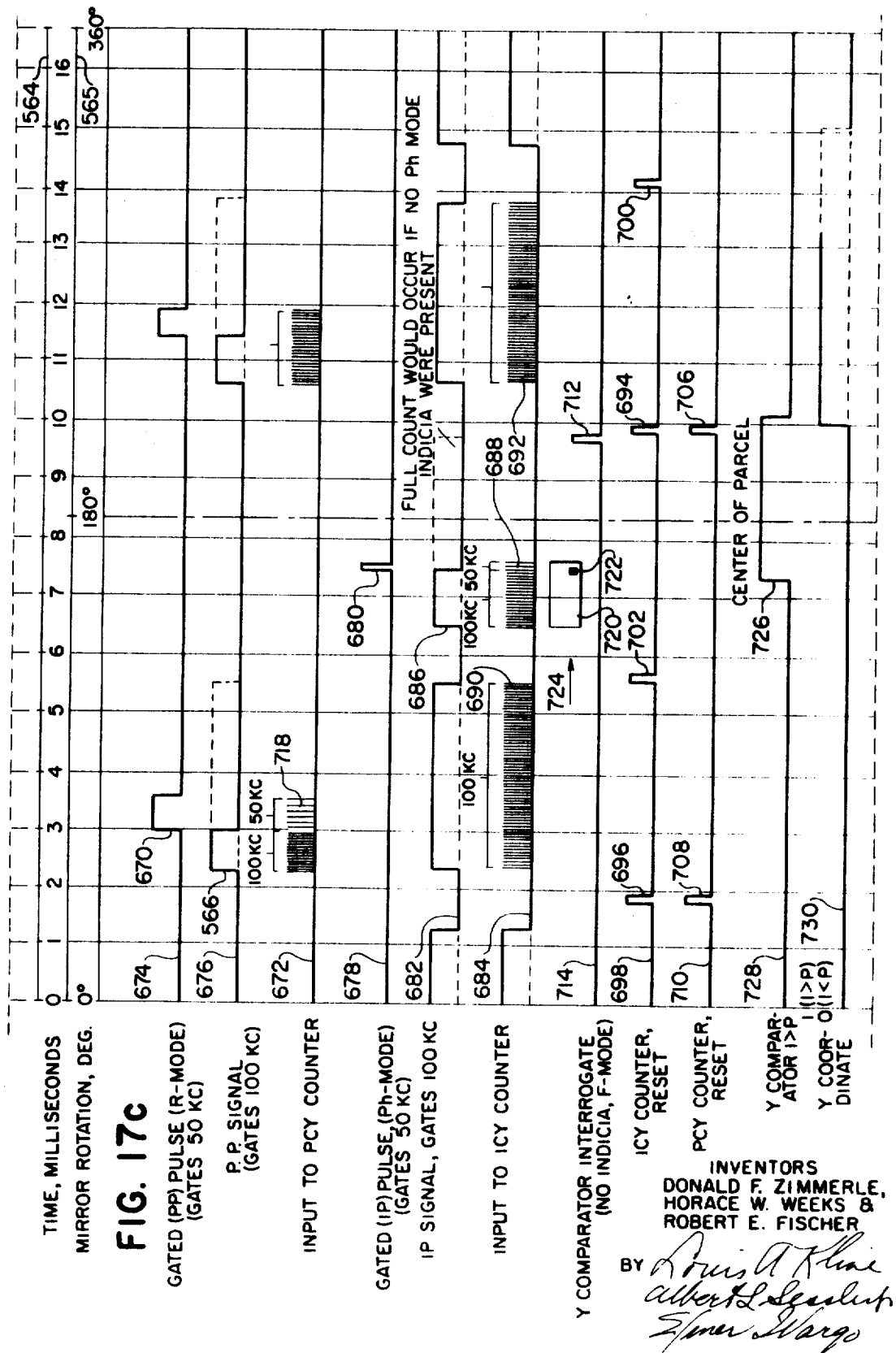

PARCEL POST SINGULATING AND ORIENTING APPARATUS

This invention was developed under a contract with the Post Office Department of the United States of America.

BACKGROUND OF THE INVENTION

This invention relates to a singulating and orienting apparatus for handling a plurality of multisided items, with each item having an identifiable mark located in one quadrant on one side thereof, so as to position the side of the item containing the mark and said quadrant in a predetermined orientation.

The Post Office Department is faced with the problem of handling an unrelenting increase in the volume of mail in an environment of increasing labor costs. To intensify the problem, the mailing public expects and demands prompt delivery of mailed items. As intercity transportation times are reduced by faster transportation means, the time consumed in handling mailed items at terminal and distribution points is becoming an increasingly larger proportion of the total mailing time.

In parcel handling, as well as other phases of mail service, mechanization of item-handling techniques appears to be the most satisfactory way to abate the problem of increasing handling times and labor costs.

The present invention was developed to provide an apparatus for accepting a plurality of multisided items (like parcels) of varying sizes and shapes, at an input hopper, and for discharging said items on a conveyor so that a particular side (like an address side) is properly oriented so as to enable an operator to read the address. The operator may have additional means (not a part of this invention) for controlling the destination of the items according to the addresses thereon. Alternately, the items may be fed into an electro-optical address reader to route the items according to control data thereon.

SUMMARY OF THE INVENTION

This invention relates to a singulating and orienting apparatus for handling a plurality of multisided items, with each item having an identifiable mark located in one quadrant in one side thereof. The apparatus comprises handling means including a moving platform for receiving said items and for arranging them in spaced, single-file relationship on the platform. There are scanning means positioned near the moving platform, which scanning means are adapted to view selected sides of the items (as they pass thereby on the moving platform) in search for the mark. In the embodiment disclosed herein, the mark used is a special postage stamp.

The invention also includes item-manipulating means which are responsive to the scanning means and which are adapted to withdraw selected items from the moving platform and rotate them, when necessary, about their own vertical and horizontal axes and return them to the moving platform, so as to position the side containing the mark in a predetermined orientation thereon.

The invention also includes quadrature scanning means, positioned along said moving platform, which scanning means is adapted to scan the oriented side of the item containing the mark to determine in what quadrant the mark is located. Additional item-manipulating means withdraw selected items from the moving platform, when necessary, and rotate said selected items about a vertical axis in response to said quadrature scanning means and return them to the moving platform, so as to orient the mark in a predetermined orientation thereon.

BRIEF DESCRIPTION OF THE DRAWINGS

FIGS. 1a and 1b taken together constitute a plan view of the apparatus of this invention, showing the general arrangement of the item-singulating means, the item-manipulating means for rotating the items about horizontal and vertical axis, and various scanning means used with this invention.

FIG. 2 is a general perspective view of one of the item-manipulating means for rotating an item about a horizontal axis which is aligned with the length of the conveyor and is depicted as viewed from the general direction indicated by the arrow marked A-2 in FIG. 1a.

FIG. 3 is a general perspective view of one of the item-manipulating means for rotating an item about a vertical axis which is perpendicular to the conveyor and is depicted as viewed from the general direction indicated by the arrow marked A-3 in FIG. 1a.

FIG. 4 is a general perspective view of a portion of the item-singulating means and is depicted as viewed from the general direction indicated by the arrow marked A-4 in FIG. 1a.

FIG. 5 is a general perspective view of a portion of the item-singulating means showing counterrotating discs and a narrow conveyor belt, and is depicted as viewed from the general direction indicated by the arrow marked A-5 in FIG. 1a.

FIG. 6 is a general perspective view of the entrance side of the housing for one of the scanning means and is depicted as viewed from the general direction indicated by the arrow marked A-6 in FIG. 1a.

FIG. 7 is a front elevational view of the entrance side of the housing shown in FIG. 6, with certain portions of the housing removed to show the scanning means therein.

FIG. 8 is a side elevational view of the right side of the housing and scanning means shown in FIG. 7.

FIG. 12 is a schematic plan view (similar to FIGS. 1a and 1b) showing an item as it is sensed by the scanning means and rotated by the various item-manipulating means of this invention.

FIG. 13 is a chart showing a Truth Table and various logic equations used in conjunction with the layout shown in FIG. 12.

FIGS. 14a to 14d inclusive, when taken together, show a portion of the circuit means for controlling the apparatus of this invention.

FIGS. 17a to 17d inclusive, when taken together, show a timing chart used with the invention, and also show the Y coordinate logic for the Y direction, which is across the width of the main belt.

DESCRIPTION OF THE PREFERRED EMBODIMENT

Figure 9:
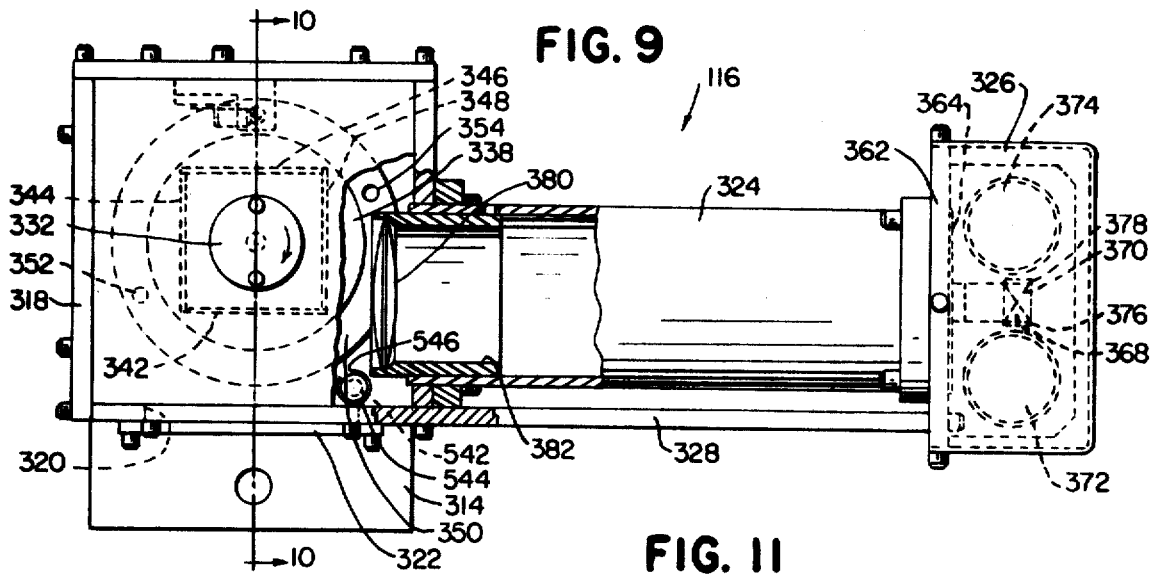
FIG. 9 is a side elevational view, partly in cross section, of the scanning means shown in FIG. 8, showing more details thereof.

FIGS. 1a and 1b, taken together, show a diagrammatic plan view of the apparatus (designated generally as 40) of this invention, which is used for singulating and orienting a plurality of multisided items of varying sizes, with each item having an identifiable mark located in a quadrant of one side thereof, so as to position the side of the item containing the mark and said quadrant in a predetermined orientation. In the embodiment disclosed herein, the items include a variety of parcel post packages of different sizes and shapes, like parcels 42 and 44

(shown in FIG. 2) and parcels 46 and 48 (shown in FIG. 3). The identifiable mark mentioned is found in a special stamp 50, located in one quadrant of the parcel, as shown on the parcel 42 shown in FIG. 2. The special nature of the stamp 50 will be discussed later herein. Because the apparatus 40 is complex and involved, it will be described only generally at first, and, as the need arises, additional details relating to it will be described.

The items or parcels to be stored by the apparatus 40 of FIGS. 1a and 1b are received as a random collection of parcels which are dumped from a truck or other conveyance onto a storage belt conveyor 52, which is conventional in construction and has vertically positioned sides 54 and 56 secured to a stationary frame (not shown), which sides retain the parcels on the conveyor. The right-hand end of the conveyor 52 (as viewed in FIG. 1a) is lower than the left-hand end, which rises to discharge the parcels onto a chute or slide 58, whose left-hand end (as viewed in FIG. 1a) is lower than its right-hand end. The parcels sliding down the slide 58 are discharged into a conventional conveyor marked induction belt 01 and designated as 60. The storage belt 52 is driven conventionally by a motor M1, and, similarly, the induction belt 60 is driven by a motor M2. A light source 62 is positioned on one side of the slide 58 and is directed at a photoelectric cell marked PCH and located on the opposite side of the slide 58. The light source 62 and the photoelectric cell PCH are positioned about an inch above the slide 58 to control the flow of parcels on the induction belt 60 in conjunction with circuit means to be described later. The belt 60 is positioned at a right angle to the slide 58. The linear speed of the induction belt 60 is considerably greater than that of the storage conveyor belt 52. This provides a separating and spreading-out effect on the parcels entering the induction belt 60.

The induction belt 60 has stationary sides 64 and 66 (FIG. 1a) secured to frame means (not shown) to retain the parcels thereon, and, in addition, has deflector plates 68 and 70 secured to the sides 64 and 66, respectively. One of the sides 66 and deflector plate 70 are shown in more detail in FIG. 4. The purpose of these deflector plates 68 and 70 is to deflect the parcels as they progress on the belt 60, so as to position the parcels close to the center of the belt. They also aid in singulating the parcels, or placing them in a single file. The induction belt 60 also has a light source 72 positioned on one side thereof, and the light source 72 is directed at a photoelectric cell, marked PCE, which is located on the opposite side of the belt. The photoelectric cell PCE is used to control the flow of parcels onto an induction belt 02, designated 74, by circuit means to be described later. The linear velocity of the induction belt 02, 74, is greater than that of the induction belt 01, as previously described, tending to further spread parcels out and align them in the direction of the motion of the induction belt 02.

The induction belt 02, designated as 74 in FIG. 1a and positioned orthogonally to the belt 60, is a conventional conveyor belt which is driven conventionally by a motor marked M3. The belt 74 has stationary sides 76 and 78 associated with it, as shown, to retain the parcels thereon. These sides 76 and 78 are secured to frame means (not shown), and the side 78 has two deflector members 80 and 82 thereon, as better shown in FIG. 4. The deflector member 82, which is secured to the deflector member 80, is triangular in cross section and has an edge 84, which is inclined at a diverging angle from the top of the belt 74 as related to a parcel progressing downstream along the belt 74. The deflector member 82 facilitates rotating parcels onto a more stable side as they progress downstream along the length of the belt 74. For example, a parcel (like 42 shown in FIG. 2) which might be supported on one narrow edge thereof on the belt 74 would be deflected by the deflector member 82 (FIG. 4) to cause it to assume the position shown in FIG. 2, in which it rests on a more stable side. This is desirable, as the stamp 50 is generally secured to a stable side of a parcel. The deflector member 80 is used to position the parcels near the center of the belt 74, as previously explained.

From the belt 74, the parcels already partially separated and singulated are fed to a pair of counterrotating discs 86 and 88.

The purpose of the discs 86 and 88, shown in FIGS. 1a, 4, and 5, is to align the center of the parcels received from the induction belt 74 with the center of a narrow belt 90. The discs are rotated in opposite directions by a conventional motor drive means M4 (FIG. 1a) and are spaced apart to receive a small center belt 92 therebetween. The adjacent sides of the discs 86 and 88 move at a higher peripheral speed than the speed of the belt 74, so as to direct the parcels away from the belt 74. The small center belt 92 is driven conventionally by a motor M5 and provides a positive forward motion to the parcels on the discs 86 and 88. If two or more parcels enter these discs at the same time, they will interfere with the centering action of each other, and one or both of the parcels will fall off the narrow belt 90 onto the slides 94 and 96 (FIG. 1a), which deliver the parcels to adjacent conveyor belts 98 and 100, which conventionally deposit these parcels on a return conveyor belt 102. The conveyor belts 98, 100, and 102 are conventionally driven continuously by a motor M13, and the belt 102 is used to return the parcels to the storage belt 52, where the parcels reenter the system. The narrow belt 92 is driven conventionally by a motor M6 (FIG. 1a), which is a rapid, start-stop motor. Two light sources 104 and 106 and associated photoelectric cells PCB and PCA, respectively, (FIG. 1a) are used to control the operation of the start-stop motor M6 by control means to be described later. By starting and stopping the narrow belt 90 at controlled times, the parcels are positioned synchronously on a main conveyor belt 108 (at a definite linear position on the belt 108). After one parcel is deposited on the main belt 108, the departure of the next parcel to leave the narrow belt 90 is delayed, so that the next parcel is spaced at a prescribed distance from the previous parcel by circuit means to be described later. The action of the discs 86 and 88, in conjunction with the action of the small center belt 92 and the narrow belt 90, produces an action on the parcels which tends to align them with their long dimensions positioned along the direction of travel.

After the singulation of the parcels, just described, the parcels are deposited on the main belt 108 in a predetermined spaced, single-file relationship. In the embodiment described, the parcels are spaced approximately 48 inches apart as measured from front edge to front edge of adjacent parcels. The belt 108 is driven conventionally by a motor M7 (FIG. 1a), so as to maintain its velocity at approximately 48 inches per second. At this rate, parcels move along the belt 108 at approximately one per second. Because of parcel dropoff at the narrow belt 90, the actual discharge rate of parcels at the end of the main belt 108 (FIG. 10) is slightly less than one per second.

Once the parcels are positioned on the main belt 108 (FIGS. 1a and 1b), in the spaced, single-file relationship generally described, it is necessary to search for that side of the parcels containing the identifiable mark. Scanning means positioned along the main belt 108 search for the mark, and manipulating means are used to withdraw selected parcels from the belt, rotate the parcels as required to present hitherto-unscanned sides to additional scanning means, and return the withdrawn parcels to the main belt. After the side containing the mark is placed in a predetermined orientation (up on the main belt 108), a final scanning means is used to determine in what particular quadrant of the side the mark lies. Additional manipulating means are similarly used to orient the mark in a predetermined way by the time the parcel containing the mark reaches the end of the main belt 108.

The first of the scanning means mentioned is designated $S_1$ and is located near the beginning of the main belt 108 (FIG. 1a). The scanning means $S_1$ is enclosed in a housing 110 (like the one shown in FIG. 6), which has an entrance opening 112, through which the parcels pass as they are moved onto the housing on the main belt 108. The exit opening (not shown) is located on the opposite side of the housing. Both entrance and exit openings in the housing 110 are provided with conventional light-blocking curtains 114 (shown only diagrammatically as a rectangle), which allow the parcels on the main belt 108 to pass through the housing 110 but maintain a necessary low ambient light level therein. The interior of the housing 110 is also finished in dull black to prevent stray light rays which may enter from being reflected therein so as to interfere with the scanning operation. Each housing 110 contains a scanning head 116 (FIG. 7), which is positioned therein to view selected sides of the parcels as they progress along the length of the main belt 108.

In order to better understand the scanning operation in relation to the manipulation means as generally described and shown in FIGS. 1a and 1b, it will be convenient to refer also to the schematic representation of this invention shown in FIG. 12. The parcel shown in FIG. 12 has its sides arbitrarily lettered A, B, C, D, and E. FIG. 12 is viewed from above with the counterrotating discs 86 and 88 shown and the main belt 108 represented by a line as shown. The direction of parcel flow along the belt 108 is represented by the arrow F. Directions to the left and right are designated by direction arrows so marked, and clockwise and counterclockwise rotations are represented by direction arrows marked CW and CCW, respectively. Assume that a parcel is entering the first scanning means $S_1$. The top of the parcel is marked as A. The left side is B; the right side is C; the bottom side is D; the trailing side or the side facing the discs 86 and 88 is E; and the leading side (opposite from the trailing side) is marked F. Assume that the indicia or mark being sought is on the trailing side, side E. In this embodiment, the mark being sought is a postage stamp containing phosphorescent and fluorescent material.

The scanning means $S_1$ (FIGS. 1a and 12) has its scanning head 116 positioned therein (as shown in solid lines in FIG. 7) so as to view the sides A and B of the parcel (FIG. 12). As previously stated, it was assumed that the mark sought is on side E; therefore, no response is registered at the scanning means $S_1$. In order to interpret the results of the various scanning means, a truth table and various logic equations were developed and are shown in FIG. 13. No response at scanning means $S_1$ becomes $\bar{S}_1$, by Logic Equation 1 of FIG. 13. Because of no response at scanning means $S_1$, a manipulating means $T_1$ becomes actuated by Logic Equation 2 through control means to be later described. Certain of the logic equations have an L factor (like $\bar{L}_{36}$) associated with them. These L factors relate to the length of the parcels and are used to inhibit a diverter to prevent a parcel which may be too long to be handled by the manipulating means from being diverted thereto. This aspect will be described later.

The manipulating means represented by $T_1$ of FIGS. 1a and 12 is effective to rotate a parcel about its horizontal axis. In terms of the parcel shown in FIG. 12, its side C is rotated from the right side of the conveyor to the top position shown near scanning means $S_2$. One such manipulating means, $T_1$, is shown in FIG. 2.

The manipulating means $T_1$ (FIG. 2) includes a diverter designated generally as 118 and a conveyor belt means designated generally as 120, which are located on opposite sides of the main belt 108 at a fixed distance from the particular scanning means with which the manipulating means is associated. The purpose of the diverter 118 is to push parcels across the conveyor belt 108 onto the conveyor belt means 120 in response to the control means previously described. The diverter 118 is conventional and need not be described in detail. It is of the type used at air transport terminals for pushing suitcases onto conveyors, and it is sufficient to state that it is driven by a motor M12-1 (FIG. 1a) and that it has a crossmember 122, which supports diverter paddles 124 and 126. When the diverter is actuated, the crossmember 122 rotates counterclockwise (as viewed in FIG. 2) about a vertical axis coincident with that of a supporting post 128 for an angle of 180°. As the crossmember 122 so rotates, the paddle 124 moves across the main belt 108 towards the conveyor belt means 120; however, the plane represented by the paddle 124 always remains parallel to the length of the main belt. Upon completion of 180° of rotation of the crossmember 122 from the position shown in FIG. 2, the leading edge 130 of the paddle 126 occupies the position shown by the leading edge 132 of the paddle 124. Use of two paddles in this manner provides sufficient speed to maintain the parcel-handling speed of one per second.

The conveyor means 120 associated with the diverter 118 (FIG. 2) includes one end roller 133, which is rotatably supported in a frame means 134 and has a horizontal axis of rotation. A drive roller 136 (FIG. 2) for the other end of the conveyor means 120 is rotatably supported in the frame means 134; however, the axis of rotation of the roller 136 is vertical. The roller 136 is driven conventionally by a motor M11-1, shown in FIG. 1a. Driving the roller 136 lowers the belt load on the belt 140 and provides easier tracking for the belt.

Between the rollers 132 and 136 there is a plurality of spaced supporting rollers 138, which are positioned at increased angles of acuteness as the rollers 138 approach the vertically positioned roller 136. An endless belt 140 is positioned on the rollers mentioned, so that, when supported thereon, the belt 140 assumes a twisted position. For the conveyor belt means 120 of FIG. 2, the belt 140 is twisted counterclockwise for an angle of 90°. A parcel received at the horizontal end of the belt 140 is rotated counterclockwise about its horizontal axis for an angle of 90°. Those parcels whose height is small with respect to width are rotated 180° instead of 90°; however, this rotation is desirable, because address labels and indicia are not normally found on the narrow sides of flat parcels. The speed of a diverter paddle moving across the belt 108 and the speed of the conveyor belt 140 are designed to enable a parcel being rotated to be returned to the main belt 108 at a location which it would have occupied thereon had it not been temporarily removed therefrom. Because of stresses produced on the twisted belt 140, it is necessary to produce the belt with a nylon core sandwiched between layers of nitrile rubber. The belt 140 is kept centered on the rollers 132 and 136 by making these rollers with crowns at their centers.

As seen from FIG. 1a, upon leaving the manipulating means $T_1$, a parcel returned to the main belt 108 approaches the scanning means $S_2$, which is similar to the scanning means $S_1$, shown in FIG. 7, except that the scanning head 116 is located on the opposite side of the housing 110 from the position shown. When the scanning member is located on the right side of the housing 110, as viewed from the entrance opening thereto, the lights 280 and 282 are shifted to a new position to illuminate the right side of a parcel passing therethrough, which new position is opposite from the position of these lights shown in FIG. 7. The scanning member for the scanning means $S_2$ would also be positioned on the right side (as viewed in FIG. 7) to scan the right and top sides of a parcel passing therethrough. A scanning member 117 is shown in FIG. 7 only to show the general orientation of the scanning member in the scanning means $S_2$. The scanning member 117 is identical in construction to the scanning member 116. To accommodate the lamps 280 and 282 are similar in construction to the overhead lamps (like the lamp 294) except that they are shorter and are focused at a vertical line which lies in a vertical plane which also includes the scanning line 315 (FIG. 8). Being on the opposite side mentioned enables the scanning head to view the sides C and D of the parcel shown in FIG. 12. Because it is assumed that the mark sought is on side E, the scanning means $S_2$ will not detect the mark (as per logic equation 3, FIG. 13), and, accordingly, a second manipulating means, $T_2$, will be actuated according to logic equation 4 by control means to be described later.

The manipulating means $T_2$ FIGS. 1a, 3, and 12) is effective to withdraw a parcel from the main belt 108 and rotate it 90° about its own vertical axis and thereafter return it to the belt 108 at a location which it would have occupied had it not been withdrawn from the belt. The means $T_2$ includes a diverter 118, already described, which, at the proper instant, pushes the particular parcel across the width of the belt 108 onto a lead-in diagonal conveyor belt 142. From the belt 142, the parcel is fed to a conventional 90° turn conveyor section 144, which rotates the parcel 90° clockwise (CW, FIG. 12) about the parcel's own vertical axis. From the conveyor section 144, the parcel is moved by a diagonal conveyor belt 146 and is returned to the main belt 108, as best seen in FIG. 3. The conveyor section 144 is normally used to change the direction of travel of an item carried thereby without changing its orientation; however, as here arranged in conjunction with the belts 142 and 144, the manipulating means $T_2$ is effective to rotate a parcel 90° about its own vertical axis. The diagonal belts 142 and 146 are made up of a plurality of endless bands, like the bands 148, shown in FIG. 3. The bands 148 are mounted on a common drive roller (not shown) on the end nearest the turn conveyor section 144 and are mounted on separate idler rollers (not shown) on the ends adjacent to the main belt 108. The bands 148 of the belt 146 are in parallel relationship with one another and are conventionally driven by a motor M10-2, shown in FIG. 1a. The diagonal belt 142 is similarly constructed and is driven by a motor M8-2 (FIG. 1a), which also drives the conveyor section 144. The centerline speed of the conveyor section 144 is approximately 283 feet per minute in the embodiment described, and the speed of the diagonal belts 142 and 146 (which are positioned at 45° to the main belt 108) is approximately 339 feet per minute. These speeds were selected to provide a component of velocity in a direction parallel to the main belt 108 so as to return the parcels to the main belt at a location which they would have occupied had they not been diverted therefrom.

As seen from FIG. 1a, upon leaving the manipulating means $T_2$, a parcel returned to the main belt 108 approaches a scanning means $S_3$, which is identical to the scanning means $S_1$, shown in FIG. 7. From this location, the scanning head 116 views the left side and the top side of the parcel passing through the housing 110. With regard to the parcel described in relation to FIG. 12, the manipulating means $T_2$ rotated the parcel about its own vertical axis for an angle of 90°, so that side E was positioned on the left side of the main belt 108 and side C still remained on top. The scanning means $S_3$ senses the top side C and the left side E (FIG. 12) of the parcel according to logic equation 5 of FIG. 13. The location of the indicia or mark is logically determined by equation 15 (FIG. 13); however, logic equation 6 states that $T_3=(B+E)L_{36}$, so that a manipulating means $T_3$ will be actuated to roll or rotate the parcel clockwise about a horizontal axis, putting the side E, containing the mark, on top. The manipulating means $T_3$ is identical to the means $T_1$, shown in FIG. 2, except that the diverter 118 and the conveyor means 120 are reversed from the positions shown and the belt 140 is twisted to rotate the parcels in a clockwise direction. The manipulating means $T_4$ (FIGS. 1a and 12), located downstream from the manipulating means $T_3$, is identical to the manipulating means $T_1$.

The manipulating means $T_1$, $T_2$, $T_3$, and $T_4$ are operated according to the conditions represented by logic equations 2, 4, 6, and 7 (FIG. 13), respectively. The logic conclusions represented by these logic equations are formed by combining the decisions made as a particular parcel passes through the scanning means $S_1$, $S_2$, and $S_3$. Escort shift register means, each an analog of the conveyor system described, are provided to make the requisite decisions available for each parcel at the various diverters when the parcel arrives. The arrival of a parcel at the diverters 118 (at the manipulating means $T_1$, $T_2$, $T_3$, and $T_4$) is sensed by photosensors (to be later described when the control means previously alluded to is described) which cause the contents of said shift registers to be read out and said equation executed). The affected parcel either is diverted onto the particular said manipulating means, or is allowed to pass and continue its progress on the main belt 108 towards the end thereof. By the time a parcel goes beyond the manipulating means $T_4$, it will have been oriented so as to place that side of the parcel which contains the mark or indicia on top, as viewed in FIGS. 1a and 12.

With the indicia or mark located on the top (FIGS. 1a and 12) side of a parcel positioned on the main belt 108, a scanning means $S_4$ is provided to determine in what particular quadrant of that side the indicia is located. The scanning means $S_4$ is similar to the scanning means shown in FIG. 7 except that the scanning head 116 is located above the parcel and is represented in dashed outline therein. A description of the scanning means $S_4$ and its operation will be given later. It is sufficient to state at this time that the scanning means $S_4$ is able to locate the indicia in one of four quadrants which are identified in FIG. 12 as upper left UL, lower left LL, upper right UR, and lower right LR. The logic equations for operating the remaining manipulating means $T_5$, $T_6$, and $T_7$ shown in FIGS. 1a, 1b, and 12 are operated by the equations 8, 9, and 10 (FIG. 13), respectively. The manipulating means $T_5$ and $T_6$ are identical to the manipulating means $T_2$, which rotates the parcels clockwise about their vertical axes. The manipulating means $T_7$ is identical to the manipulating means $T_2$ except that it is arranged to rotate the parcels counterclockwise about their vertical axes. If the indicia is located in the lower left LL quadrant, for example, logic equations $T_5$ and $T_6$ are pertinent, and the manipulating means $T_5$ and $T_6$ would operate on the parcel, successively, so as to subject it to two 90° rotations about the parcel's vertical axis and thereby position the indicia in the upper right UR quadrant, which is the predetermined orientation for the specific embodiment disclosed.

Part of the control means alluded to earlier for controlling the operation of this invention is shown in FIGS. 14a to 14d inclusive. These figures, when taken together, comprise the control means for controlling the handling of parcels generally from the time they are received at the storage belt conveyor 52 (FIG. 1a) to the time they are delivered in single-file, equidistantly spaced relationship on the main conveyor belt 108.

The control means shown in FIGS. 14a to 14d inclusive receives its power from a source of 220 volts, three-phase, 60 c.p.s. alternating current having a triple-pole, single-throw switch 150 connected in series with the individual conductors 152, 154, and 156. An isolated source of 110-volt single-phase, 60 c.p.s., alternating current for the controls is derived from the conductors 152 and 154 by a conventional transformer arrangement 158, whose output produces 110 volts on lines L1 and L2, line L2 being conventionally grounded. In order to facilitate the description of the control means, the connections which are made to line L1 will be referred to as L1-1, L1-2, etc. and, similarly, the connections made to line L2 will be referred to as L2-1, L2-2, etc. Suitable fuses, located at various points in the control means, will be marked simply as F2, and conventional protective overload devices will be marked as O.L. on the drawings. Single-pole double-throw switches which are used for making the operation of the control means automatic or hand-operated will be designated as HOA-1, HOA-2, etc.

The control means for controlling the apparatus of this invention is energized by the closing switch 150, which energizes the conductor lines L1 and L2 (FIGS. 14a to 14d). A group of normally closed, emergency-stop switches 160 and a master stop switch 161 are connected together in series, as shown, with the first one of the group connected to one line L1 at L1−a and the master stop switch 161 connected to one terminal 162 of a master start switch 164. The switches 160 are located at various spaced points along the length of the apparatus 40 (FIGS. 1a and 1b) to provide a means for disabling the apparatus should trouble arise. The remaining terminal 166 of the switch 164 is connected in series with a group of series-connected, normally closed, jam-detection switches 167, which represent conventional mechanical and photoelectric jam detection circuits (not shown in the drawings) for detecting undesired parcel accumulation at certain areas along the apparatus. The last of the switches 167 is connected to a terminal 168, to which one end of a relay B6 is connected. The remaining end of the relay B6 is connected to a terminal 170, which is connected (through conventional, normally closed switches O.L. of conventional overload devices) to a terminal L2-*a* on the conductor line L2.

When the master start switch 164 is momentarily closed, the relay B6 (FIG. 14*a*) is energized, closing its associated normally open switch 172 (connected in parallel with the switch 164) to provide a holding circuit for the relay B6. When the relay B6 is energized, a control relay CRM (connected to contacts 168 and L2–*a*) is also energized. The relay CRM has normally open (hereinafter called N.O.) switches CRM–1 and CRM–2 associated with it, which switches becomes closed upon the energization of the relay. The closing of the switch CRM–1 (connected between the contacts L1-*a* and L1–1) is effective to energize the remainder of the conductor line L1, and, similarly, the closing of the switch CRM–2 (connected between the contacts L2-*a* and L2–1) is effective to energize the remainder of the conductor line L*a*. Another control relay CRB is connected across the terminals 168 and 170 and has two N.O. switches cRB–1 and CRB–2 (FIG. 14*c*) associated with it. The switch CRB–1 has one terminal connected to the line L1 at L1–5, and the other terminal is connected to the center pole 174 of a single-pole switch HOA–5, which is used for selecting hand operation or automatic operation. The switch CRB–2 has one terminal connected to the line L2 at L2–5, and the other terminal is connected to a plurality of series-connected, overload devices represented by normally closed (hereinafter called N.C.) switches O.L. The last O.L. switch is connected in series with one terminal of a motor relay MR6, which controls the energization of the motor M6 (FIGS. 1*a* and 14*a*), which is operatively connected to the narrow belt 90. This portion of the circuit means will be described later.

With the master start switch 164 closed, and with the conductor lines L1 and L2 energized along their complete lengths (FIGS. 14*a* to 14*d*), individual switches HOA–1 to HOA–9 inclusive are used to place the apparatus 40 in automatic operation by moving the center pole of each of these switches to the contact marked A. The center poles of the switches HOA–1 through HOA–9 are connected to the line L1 at contacts L1–1 through L1–9, respectively.

With all the HOA switches placed in the automatic position, the following conveyor belts are activated. When the switch HOA–1 (FIG. 14*a*) is placed to the automatic position, the center pole 176 thereof is connected to its terminal A, to which is connected one end of a conductor 178. The other end of the conductor 178 is connected to one end of a time delay unit represented by N.C. switch TDD, whose other end is connected to one end of a motor relay MR1. The remaining end of the relay MR1 is connected through overload switches O.L. to line L2 at L2–1. Relay MR1 has three N.O. switches, MR1–1, MR1–2, and MR1–3, associated therewith, which switches are connected to conductors 152, 154, and 156 (FIG. 14*a*), respectively. When relay MR1 is energized, its associated switches are closed to complete an energizing circuit to the motor M1 FIGS. 14*a* and 1*a*), which conventionally drives the storage belt 52. Relay MR1 may also be energized when the center pole 176 of the switch HOA–1 contacts the terminal marked H by closing a N.O. start switch 180, which is in series with a N.O. stop switch 182 (connected to the terminal H). A holding circuit is provided for the relay MR1 by its N.O. switch MR1–4 connected across the terminals of the manual start switch 180. Unless otherwise specified, the motors M2 to M13 inclusive (which are to be described) are connected to the conductor lines 152, 154, and 156 by their associated N.O. switches like MR1–1, MR1–2, and MR1–3, already described for the motor M1.

The induction belt 01 (60) (FIG. 1*a*) is energized by an arrangement generally similar to that already described in relation to the conveyor belt 52. When the center pole 184 (FIG. 14*b*) of the switch HOA–2 engages its associated contact A, an energizing current passes from the contact L1–2, over a conductor 186, and through a N.C. switch KD–1 to energize a relay MR2, which is connected to the line L2 at L2–2. The relay MR2, when energized, actuates its associated motor M2 by the technique already described in relation to the energization of the motor M1. The motor M2 conventionally drives the induction belt 01 (60). The relay MR2 also has a fourth switch, MR2–4, associated with it to provide a holding circuit to it when a N.O. manual start switch 188 is closed. Closing the switch 188 provides an alternate energizing route to the relay MR2 over a conductor 190 connected to terminal H of the switch HOA–2 and N.C. manual stop switch 192; this is effective when the center pole 194 of the switch HOA–2 contacts the terminal marked H.

The induction belt 02 (74) (FIG. 1*a*) is energized by an arrangement which also is generally similar to that already described in relation to the conveyor belt 52. When the center pole 194 of the switch HOA–3 (FIG. 14*b*) engages its associated contact A, an energizing current passes from the contact L1–3 over a conductor 196 to one terminal of a motor relay MR3, whose remaining terminal is connected to the line L2 at L2–3. The relay MR3, when energized, actuates its associated motor M3 (FIG. 1*a*) by the technique already described, in relation to the energizing motor M1.

The motor M3 conventionally drives the induction belt 02. The motor M3 has three N.O. switches (not shown) in series with the conductors 152, 154, and 156, which close upon the energization of the relay MR3. An alternate energizing route is provided for the relay MR3 by a conductor 198, a N.C. manual stop switch 200, and a N.O. start switch 202, as shown. A holding circuit for the alternate route is provided by a N.O. switch MR3–4 (connected in parallel across the switch 202) associated with the relay MR3. The motor relay MR13 is connected to conductor 196 and L2–3*a* and is energized whenever the relay MR3 is energized to energize its associated motor M13.

The motor M4 for driving the discs 86 and 88 (FIG. 1*b*) is energized when a motor relay MR4 (FIG. 14*b*) is energized. When the center pole 204 of the switch HOA–4 engages its contact marked A, an energizing current passes from the contact L1–4 over a conductor 206 to one terminal of the relay MR4, whose remaining terminal is connected to line L2 at L2–4. When the relay MR4 is energized, the motor M4 is energized to conventionally drive the discs 86 and 88. An alternate energizing route is provided for the relay MR4 by a conductor 208, a N.C. manual stop switch 210, and a N.O. manual start switch 212, as shown. A holding circuit for the alternate route is provided by a N.O. switch MR5–4 associated with a relay MR5 and connected in parallel across the switch 212. The motor M5 (FIG. 1*a*) for driving the center belt 92 is energized when the associated motor relay MR5 (FIG. 14*c*) is energized. This relay MR5 has one terminal connected to line L2 at contact L2–4*a* and its other terminal connected to one terminal of a N.O. switch MR4–4 (FIG. 14*c*) associated with the relay MR4. The remaining terminal of the switch MR4–4 is connected to the contact marked A of the switch HOA–4. The alternate energizing route for the motors M4 and M5 is obtained by closing the switch 212 when the center pole 204 of the switch HOA–4 is placed on the contact H. When the relay MR4 is energized, its associated N.O. switch MR4–4 is closed to energize the relay MR5, whose N.O. switch MR5–4 provides a holding circuit for the relay MR4.

The motor M6 (FIG. 1*a*) for driving the narrow belt 90 is energized when a motor relay MR6 (FIG. 14*c*) is energized. One terminal of the relay MR6 is connected to the contact L2–5 (when the N.O. switch CRB–2 is closed), and its other terminal is connected to one terminal of a N.O. switch PCB–1, whose remaining terminal is connected to one terminal of a N.O. switch MR6–4. The remaining terminal of the N.O. switch MR6–4 is connected to the contact A of the switch HOA–5, and another N.O. switch, T1–C, is connected in parallel across the terminals of the N.O. switch MR6–4. A N.C. switch PCA–1 is connected in parallel across the terminals of the N.O. switch PCB–1. A control relay K6A has one terminal thereof connected to the contact L2–5*a*, while its other terminal is connected to one terminal of the N.O. switch PCB–1, as shown. An alternate energizing route for the motor relay MR6 is provided by a conductor 214, a N.C. manual stop switch 216, and a N.O. manual start switch 218, as shown. A holding circuit for the alternate energizing route is provided by a N.O. switch MR6-5 (associated with the relay MR6) and connected in parallel across the terminals of the start switch 218.

The main conveyor belt motor M7 (FIG. 1a) is energized when its associated motor relay MR7 (FIG. 14c) is energized. When the center pole 220 of the switch HOA-6 engages its contact A, an energizing current passes from the contact L1-6 over a conductor 222 to one terminal of the motor relay MR7, whose remaining terminal is connected to the contact L2-6 to energize the relay. An alternate energizing path for the relay MR7 is provided by a conductor 224, a N.C. manual stop switch 226, and a N.O. manual start switch 228, as shown. The relay MR7 has three N.O. switches (not shown) in series with the conductors 152, 154, and 156, which close upon the energization of the relay to energize the motor M7, which conventionally drives the main belt 108. An additional N.O. switch MR7-4, connected in parallel across the terminals of the switch 228, provides a holding circuit for the relay MR7 when the alternate energizing route is utilized.

Figure 14D:
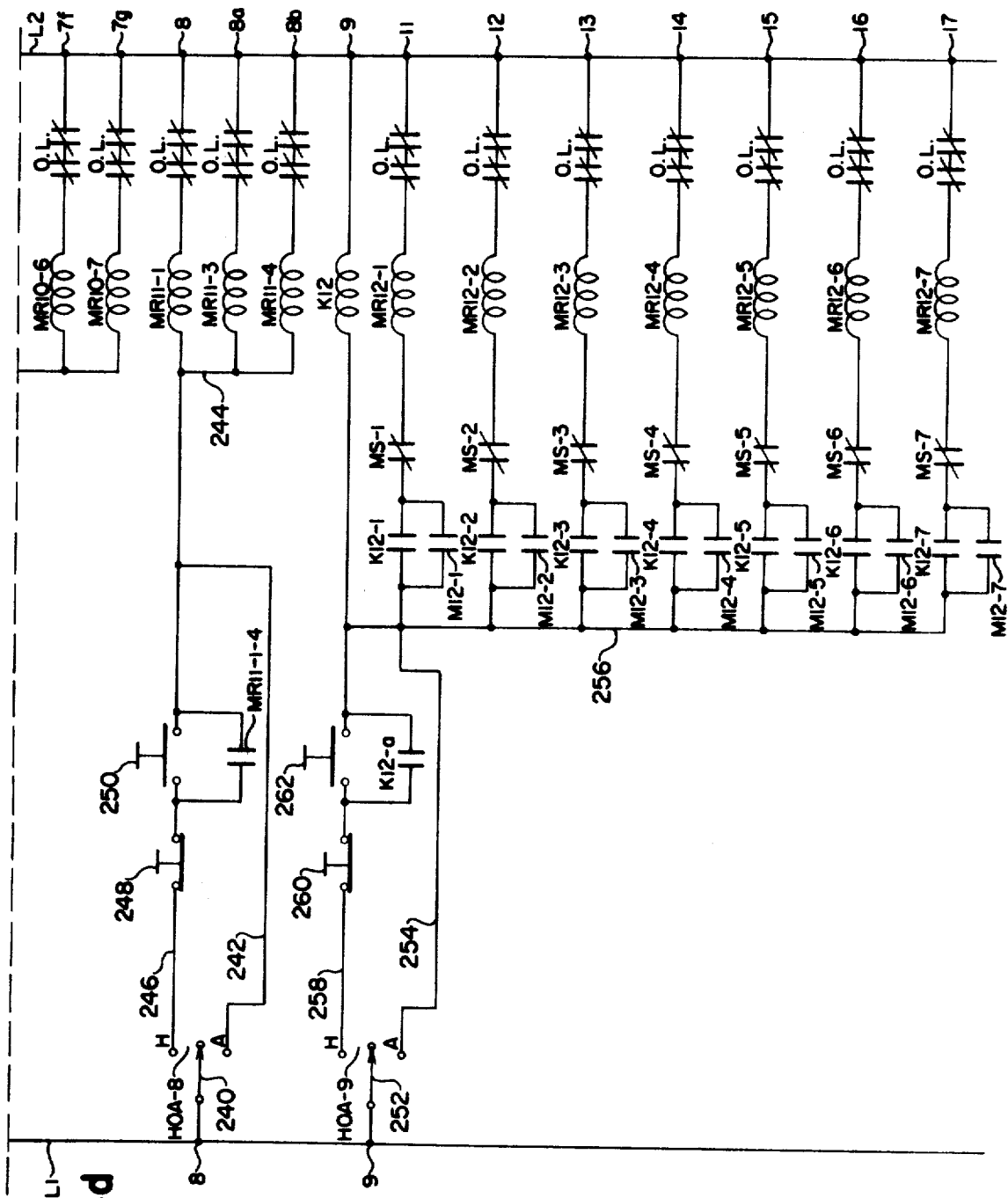

The motors associated with the various manipulating means $T_2$, $T_5$, $T_6$, and $T_7$ (FIGS. 1a and 1b) are energized when their associated motor relays are energized. When the center pole 229 of the switch HOA-7 engages its contact A, an energizing current passes from the contact L1-7 over a conductor 230 to a common conductor 232 FIGS. 14c and 14d). The motor relays MR8-2, MR8-5, MR8-6, and MR8-7 associated with the manipulating means $T_2$, $T_5$, $T_6$, and $T_7$, respectively, each have one terminal thereof connected to the common conductor 232, and the other terminal of each is connected to the line L2 at the contacts L2-7, L2-7a, L2-7b, and L2-7c, respectively. When the relay MR8-2 is energized, the motor M8-2 (FIG. 1a) is energized; when the relay MR8-5 is energized, the motor M8-5 (FIG. 1b) is energized; when the relay MR8-6 is energized, the motor M8-6 (FIG. 1b) is energized and when the relay MR8-7 is energized, the motor M8-7 (FIG. 1b) is energized, by the technique already explained. The motors M10-2, M10-5, M10-6, and M10-7 (FIGS. 1a and 1b) for operating the diagonal belts 146 associated with these manipulating means are energized when their associated motor relays MR10-2, MR10-5, MR10-6, and MR10-7, respectively, are energized; these said motor relays are connected between the common conductor 232 and the line L2 at the contacts L2-7d, L2-7e, L2-7f, and L2-7g, respectively, as shown in FIGS. 14c and 14d. An alternate route to apply potential to the common conductor 232 is provided by a conductor 234, a N.O. manual stop switch 236, and a N.O. manual start switch 238. A holding circuit for this alternate path is provided by N.O. switch MR10-2-4 associated with the relay MR10-2.

The motors associated with the various manipulating means $T_1$, $T_3$, and $T_4$ (FIGS. 1a and 1b) are similarly energized when their associated motor relays are energized. When the center pole 240 (FIG. 14d) of the switch HOA-8 engages its contact marked A, an energizing current passes from the contact L1-8 over a conductor 242 to a common conductor 244. The motor relays MR11-1, MR11-3, and MR11-4 associated with the manipulating means $T_1$, $T_3$, and $T_4$, respectively, each have one terminal thereof connected to the common conductor 244, and the other terminal of each is connected to the line L2 at the contacts L2-8, L2-8a, and L2-8b, respectively. An alternate energizing path for the common conductor 244 is provided by a conductor 246, a N.C. manual stop switch 248, and a N.O. manual start switch 250, as known. A holding circuit for this alternate path is provided by a N.O. switch MR11-1-4 associated with the relay MR11-1. When the relays MR11-1, MR11-3, and MR11-4 are energized, their associated motors M11-1, M11-3, and M11-4, respectively, are energized.

The motors associated with the various diverters 118 shown with the various manipulating means $T_1$ through $T_7$ (FIGS. 1a and 1b) are energized when their associated motor relays are energized. When the center pole 252 of the switch HOA-9 (FIG. 14d) engages its contact marked A, an energizing current passes from the contact L1-9 over a conductor 254 to a common conductor 256. A control relay K12 has one terminal thereof connected to the common conductor 256, and its remaining terminal is connected to the line L2 at L2-9. Each of the diverter motor relays MR12-1 through MR12-7 (FIG. 14d) has one terminal thereof connected to the line L2 at the contacts L2-11 through L2-17, respectively, and the remaining terminal connected to one end of a N.C. switch MS1 through MS7, respectively. Each of the remaining ends of the N.C. switches MS1 through MS7 is connected to one end of a N.O. switch K12-1 through K12-7, respectively, whose remaining ends are connected to the common conductor 256. Each of the N.O. switches K12-1 through K12-7 has a N.O. switch M12-1 through M12-7, respectively, connected in parallel across the terminals thereof, as shown in FIG. 14d. The N.O. switches K12-1 to K12-7 are closed by circuitry to be later described when the associated diverter 118 is to be actuated. An alternate energizing route for the relay K12 is provided by a conductor 258, a N.C. manual stop switch 260, and a N.O. manual start switch 262, as shown. A holding circuit for this alternate path is provided by a N.O. switch K12-a (associated with the relay K12), which is connected in parallel across the terminals of the manual start switch 262. When each diverter relay MR12-1 through MR12-7 is energized, its associated diverter motor M12-1 through M12-7, respectively, is energized according to the techniques already explained.

Some additional wiring details relating to the control means shown in FIGS. 14a to 14d are as follows. A conductor 264 (FIG. 14b) is connected to the conductor 186, as shown, and to one terminal of a N.C. switch KD-3 associated with a control relay KD. The remaining terminal of the switch KD-3 is connected to one terminal of a N.C. switch PCE-1 associated with the photoelectric cell PCE, the cell PCE being located near the end of the induction belt 01 (60) in FIG. 1a. The remaining terminal of the switch PCE-1 is connected to one terminal of a control relay KA, whose remaining terminal is connected to the line La at the contact L2-2a. From one terminal of the N.C. switch PCE-1, a N.O. switch TDC is connected to one terminal of a control relay KE, whose remaining terminal is connected to a common conductor 266, which is also connected to the contact L2-2a. From the conductor 264, a N.O. switch TDA is connected to one terminal of a control relay KF, whose remaining terminal is connected to the conductor 266. A group of switches including N.C. switch TDB, N.C. switch PCE-2, N.C. switch KF-1, and N.O. switch KC-1 are series-connected to one another, as shown, with one terminal of the switch TDB (the first of the group) being connected to the conductor 264, and one terminal of the switch KC-1 (the last of the group) being connected to one terminal of a control relay KD, whose remaining terminal is connected to the conductor 266. A N.O. switch KD-2 (FIG. 14b) is connected in parallel across the switches PCE-2, KF-1, and KC-1 at terminals 268 and 270, as shown in FIG. 14b, and another N.O. switch KE-1 is connected across these same terminals. A conductor 272 connects the terminal 268 with one terminal of a N.C. switch KF-2, whose remaining terminal is connected to a N.O. switch KB-1 in series with a control relay KB, which is connected to the common conductor 266. A N.O. switch KA-1 is connected in parallel across the switch KB-1 and is connected to one terminal of a N.C. switch KA-2 at terminal 274. The other terminal of the switch KA-2 is connected at terminal 276 to one terminal of a control relay KC, whose remaining terminal is connected to the common conductor 266. A N.O. switch KC-2 is connected across the terminals of the N.C. switch KA-2.

As previously stated, the operation of the control means shown in FIGS. 14a to 14d is started by closing the master start switch 164 and by placing all the center poles of the HOA switches on the contact marked A for automatic operation when automatic operation is desired. Assume that no parcels are on any part of the apparatus 40 FIGS. 1a and 1b) except on the storage belt 52. The storage belt 52, the induction belts 60 and 74, the center belt 92, the rotating discs 86 and 88, the narrow belt 90, the main conveyor belt 108, and all the manipulating means $T_1$ through $T_7$ are all activated by the closing of the HOA switches according to the techniques already described. The diverters 118 at each of the manipulating means $T_1$ through $T_7$ are also enabled and are ready to operate when directed to do so by control means to be described later.

The parcels which are deposited on the storage belt 52 (FIG. 1a) are carried upwardly thereby and are deposited on the slide 58, where gravity feeds the parcels towards the induction belt 01 (60). The slide reduces piling up of the parcels and permits measurement and control of parcel flow. Control of the parcel flow is accomplished by the photoelectric cell PCH (FIG. 1a), which is positioned about 10 to 12 inches upstream from the lower end of the slide 58. The photoelectric cell PCH is actually a part of a conventional photoelectric control unit 277 shown connected across the lines L1 and L2 in FIG. 14c. The unit 277 has a N.C. switch 279 and a N.O. switch 281 associated with it, and these switches are activated upon the interruption of the light beam to the associated photoelectric cell. In some instances, the output of the photoelectric unit 277 is used to control the operation of a conventional time delay unit 283, shown also in FIG. 14c. When the time delay unit 283 is to be energized, its input terminals E, F are shorted by an external switch (which may be part of a photocontrol unit 277), and its N.C. switch 285 and N.O. switch 287 are accordingly activated after a specified delay time. The delay unit is connected across the lines L1 and L2, as shown. In the description which follows, only the normally closed or normally open switches associated with the photoelectric cell are shown on the drawings 14a to 14d. If a switch associated with a photoelectric cell or other component is used to actuate a time delay unit, it will be shown as being connected to arrows marked E and F, as, for example, the N.C. switch PCH shown in FIG. 14a. When a time delay unit (like 283) is used, only the associated switches 285 and 287 will be shown, as, for example, the N.C. switch TDD shown also in FIG. 14a. A time delay unit (like 283) may also be operated by switch contacts, as, for example, TDB, shown in FIG. 14c, which unit is operated by the N.O. switch KD-3.

When light strikes the photoelectric cell PCH, its associated switch remains normally closed, and, when the light thereto is interrupted, said switch is opened. The photoelectric cell PCH operates a conventional time delay relay unit, represented by the N.C. switch TDD (FIG. 14a). The time delay setting of this delay unit is variable between 60 and 500 milliseconds, and the particular setting used in this embodiment is approximately 420 milliseconds. This time value was chosen so as to enable a single parcel 24 inches long to slide past the photoelectric cell PCH before the delay unit TDD completes its delay cycle and thereafter opens the switch TDD. The delay unit TDD is of the "reset" variety, which resets the cycle time to zero if light strikes the photoelectric cell PCH before the delay cycle is completed. If several parcels accumulate on the slide 58, so as to block the light from the light source 62 to the cell PCH, the N.C. switch TDD will open after the lapse of the set delay time. With the switch TDD opened, the motor relay MR1 is deenergized to deenergize the motor M-1 and stop the movement of the storage belt 52. When the parcels blocking light to the photoelectric cell PCH are removed orthogonally by the induction belt 01 (60), the light beam to the photoelectric cell PCH will be reestablished, and the motor M-1 will be reenergized to feed parcels, as previously explained. In the embodiment shown, the velocity of the storage belt 52 is 3 inches per second, and the velocity of the induction belt 01 is about 12 inches per second. This combination of velocities results in a parcel separation or a tendency to break up parcel clusters and is designed to obtain a desired rate of parcel flow of one parcel per second when the parcels are eventually deposited on the main belt 108.

The movement of the induction belt 01 (60) is controlled by the flow of parcels at its discharge end (near the induction belt 02 (74). The plan for controlling the induction belt 01 is to stop it for a prescribed interval whenever (a) an unbroken group of parcels exceeds a critical length (typically 24 inches) at the end of the induction belt 01; and (b) the separation of individual parcels at the end of the induction belt 01 is less than a certain distance (typically 4 inches).

The stopping action according to (a) above tends to break up large clumps of parcels which were not separated by the induction belt 01, and the stopping action according to (b) above tends to spread out the parcels for better movement and feeding into the rotating discs 86 and 88 (FIG. 1a). The photoelectric cell PCE for controlling the movement of induction belt 01 is placed near its end, so that the belt, upon coasting to a stop after deenergization of its associated motor M-2, will generally cause a dropoff, onto the induction belt 02, of only the first parcel or parcels approaching the belt 02. This action tends to break up large parcel clumps, because one or more of the parcels will tend to fall onto induction belt 02, while the rest of the parcels will be delayed on belt 01 until belt 01 is restarted.

The circuit for controlling the movement of induction belt 01 (60) (FIG. 1a) is included in the control means shown in FIGS. 14a to 14d. When the switch HOA-2 is placed in automatic operation, the motor relay MR2 is energized through the N.C. switch KD-1 associated with the relay KD. The energization of the motor relay MR2 energizes the motor M2 (FIG. 1a) to move induction belt 01. The photoelectric cell PCE located near the end of induction belt 01 has two N.C. switches PCE-1 and PCE-2 associated with it. These switches are open when light from the light source 72 falls upon the cell PCE. With no light on the cell PCE (a parcel-blocking condition), the said associated switches are closed. When a parcel on belt 01 blocks the light to the cell PCE, the switches PCE-1 and PCE-2 become closed to complete an energizing circuit to the control relay KA from the conductor 264 and the N.C. switch KD-3 and the switch PCE-1. Once the control relay KA is energized, its associated N.O. switch KA-3 (associated with a conventional time delay unit represented by TDC in FIG. 14a) will close to energize the delay unit to start the time delay period, which is typically about 2 seconds (to allow 24 inches of parcel to pass). If the parcel-blocking condition remains until the expiration of said time delay period, the N.O. switch TDC associated with the delay unit TDC will close to energize control relay KE in series therewith. When the relay KE is energized, its associated N.O. switch KE-1 closes to energize the relay KD through the N.C. switch associated with the time delay unit TDB (FIG. 14b). A holding circuit for the relay KD is provided by its associated N.O. switch KD-2 (connected to the terminals 268 and 270), which closes upon the energization of the relay KD. Because the N.C. switch KD-1 is in series with the motor relay MR2, this relay is deenergized upon the energization of the relay KD to thereby deenergize the motor M2 (FIG. 1a) and stop the movement of induction belt 01 (60). At the same time that the relay KD is energized, its associated N.O. switch KD-4 closes to energize a time delay unit TDB, whose purpose is to control the dwell time or stopping interval for induction belt 01. Upon the expiration of the dwell time of the unit TDB (which in this embodiment is about 40 milliseconds), its associated N.C. switch connected to the conductor 264 opens to deenergize the control relay KD. When the control relay KD is deenergized, its N.C. switch KD-1 recloses to energize the motor relay MR2 in series therewith and start the induction belt 01 moving again.

The circuit for controlling the movement of induction belt 01 (60) (FIG. 1a), so as to space successive parcels thereon, is also shown in FIGS. 14a to 14d. When the light beam to the photoelectric cell PCE (FIG. 1a) is interrupted, its associated switch PCE-1 (FIG. 14a) becomes closed to energize the control relay KA. The N.O. switch KA-1 closes upon energization of the relay KA to thereby energize the control relay KB through the N.C. switch TDB connected to the conductor 264, and the N.C. switch KF-2 associated with the control relay KF. A holding circuit is provided for the relay KB through its associated N.O. switch KB-1, which is connected across the terminals of the N.O. switch KA-1. The relay KB is energized to record the fact that the leading edge of a parcel has passed the photoelectric cell PCE (FIG. 1a). When this parcel (presumably less than 24 inches long) leaves the photoelectric cell PCE, the relay KA is deenergized. Because of the holding circuit provided to control relay KB by its associated N.O. switch KB-1, an energizing current passes to control relay KC via the N.C. switch KA-2 associated with the relay KA. A holding circuit for the relay KC is provided by its associated N.O. switch KC-2, which closes upon the energization of the relay to record the fact that the trailing edge of the parcel has passed the photoelectric cell PCE. At this time, the relay KD is still deenergized to enable the induction belt 01 to be moved. When the relay KC is energized, its associated N.O. switch KC-3 becomes closed to start the time period of a conventional time delay unit TDA. An energizing path to the relay KD is partially set up by current passing from the conductor 264 through the N.C. switch TDB, the N.C. switch PCE-2 (which is now open due to no parcel blocking a light beam to the photoelectric cell PCE in FIG. 1a), the N.C. switch KF-1 associated with the relay KF, and the N.C. switch KC-1, which is now closed due to the energization of the relay KC. When the next parcel arrives at the photoelectric cell PCE, the N.C. switch PCE-2 will close and complete the partially setup energizing path to the relay KD, provided that the N.C. control switch KF-1 remains closed; that is, provided that the control relay KF remains deenergized. If the control relay KF remains deenergized, it means that the said next parcel is following the preceding parcel by a distance less than the predetermined spacing (4 inches), and therefore the control relay KD should be energized to stop the movement of induction belt 01. If the control relay KF is energized (by the closing of N.O. switch TDA in series with the conductor 264 and the relay KF), it means that the said next parcel (if any) is following the preceding parcel by at least 4 inches, so there is no need to stop the induction belt 01. When the relay KF is energized, its associated N.C. switch KF-1 will open to prevent the energization of the relay KD along the energizing path which was partially set up. With the energization of the relay KF, its associated N.C. switch KF-2 opens to deenergize the control relays KB and KC. A typical time setting for the time delay TDA is 0.16 second.

In summary, if two parcels which are separated by less than 4 inches pas the photoelectric cell PCE, the control relay KD is energized when the second parcel interrupts the light beam to the cell PCE. Energization of the relay KD stops the movement of induction belt 01, as previously explained. When the relay KD is energized, the time delay TDB (which determines the dwell time of the induction belt 01) is also started. A holding circuit for the relay KD is provided by its N.O. switch KD-2, which is connected across a control chain of switches (the switches between the contacts 268 and 270, already described). When the time delay relay TDB is actuated to open the N.C. switch TDB, the said control chain is reset.

The induction belt 02 (74) shown in FIG. 1a, orthogonally carries the parcels deposited thereon by the induction belt 01 to the counterrotating discs 86 and 88, as previously explained. The belt 74 is driven continuously by the motor M3 (which is controlled by the circuit means shown in FIGS. 14a to 14d) at a velocity of about 28 inches per second. In view of what has already been explained, the operation of the motor relay MR3 associated with the motor M3 is self-explanatory.

The motors M5 and M4 for respectively driving the center belt 92 (FIG. 1a) and the rotating discs 86 and 88 are driven continuously; however, the control means (FIGS. 14a to 14d) for the operation of the belts 92 and 90 need further explanation. When the switch HOA-5 is in the manual or hand position, the motor M6 (FIG. 1a) for controlling the movement of the narrow belt 90 is controlled by the manual start and stop switches 218 and 216, respectively. This same technique is used to control the various motors associated with the start and stop switches connected to the other remaining HOA switches shown in FIGS. 14a to 14d. When the switch HOA-5 is placed in the automatic position, the operation of the apparatus 40 of FIGS. 1a and 1b is controlled so as to discharge only one parcel onto each 48 inches of the main belt 108.

The control of the narrow belt 90 (FIG. 1a) when the switch HOA-5 is placed in the automatic position is best described in relation to the control means shown in FIGS. 14a to 14d and is obtained as follows. A timing signal (parcel shift pulse) occurring once per second is obtained by the periodic momentary closing of a N.O. switch T1-C associated with the main conveyor belt 108. The switch T1-C (connected to the switch HOA-5) is operatively connected to the conveyor belt 108 by a conventional actuator means 274 (represented by a dashed rectangle and a dashed line, respectively, in FIG. 14c), so that the switch is closed once for each 48 inches of travel of the belt 108, which travels at the rate of 48 inches per second. If no parcel is present on the narrow belt 90, the motor relay MR6 (associated with the motor M6) will be energized by the next periodic closing of the N.O. switch T1-C, which carries an energizing current from contact A of the switch HOA-5 through the N.O. switch PCB-1 associated with the photoelectric cell PCB (FIG. 1a) to one terminal of the motor relay MR6. The N.O. switch PCB-1 is closed when light reaches the cell PCB, and becomes opened when a parcel blocks the light to the cell. With no parcel on the belt 90 at this time, the N.C. switch PCA-1 is opened due to light also reaching the associated photoelectric cell PCA (FIG. 1a). When the motor relay MR6 is energized, its associated N.O. switch MR6-4 (connected across the terminals of the N.O. switch T1-C) becomes closed to provide a holding circuit for the relay. When a parcel is eventually fed onto the narrow belt 90, it first interrupts the light beam to the photoelectric cell PCB, which is positioned near the belt upstream from the photoelectric cell PCA. A parcel which blocks light to the cell PCB causes the associated N.O. switch PCB-1 to open, breaking the energizing circuit to the relay MR6, which deenergizes the associated motor M6, permitting the narrow belt and the parcel thereon to stop. Although the narrow belt 90 stops very suddenly (because of a special braking arrangement to be later described), the belt and the parcel advance further downstream, where the parcel blocks the light to the photoelectric cell PCA, causing its associated switch PCA-1 to become closed. When the next parcel shift pulse is received via the closing of the N.O. switch T1-C, the motor relay MR6 will again be energized to move the parcel onto the main belt 108 (FIG. 1a). As the trailing edge of the parcel moves past the photoelectric cell PCB, its associated switch PCB-1 becomes closed upon light reaching the cell to maintain energization of the relay MR6 and thereby deliver the parcel to the main belt 108 in a synchronous manner. As the trailing edge of the parcel passes the photoelectric cell PCA, light again falls thereon to open the switch PCA-1. The narrow belt 90 continues to move until the next parcel approaches the photoelectric cell PCB to repeat the process of synchronous feeding already explained. Because the control relay K6A is connected in parallel across the motor relay MR6, it is energized and deenergized at the same times as the relay MR6. The relay K6A has a N.O. switch K6A-1 (FIG. 14b) associated with it, which switch (when closed) actuates a conventional clutch means (not shown) to couple the continuously running motor M5 to the center belt 92 (FIG. 1a) to drive it. By this construction, the center belt 92 is driven in synchronism with the narrow belt 90.

The motor M6 is a conventional motor designed for rapid automatic braking. In the embodiment shown, a Warner Clutch-Brake Model EM-50-12 was used. Because this motor requires a great amount of cooling, the relay B6 (FIG. 14a) was used to energize a blower (not shown) to cool the motor M6. As a precaution, the energizing circuit to the motor M6 (FIG. 14c) is energized only when the control relay CRB is energized to close the N.O. switches CRB-1 and CRB-2 in series with this energizing circuit. The control relay CRB is energized at the same time that the blower relay B6 is energized.

The parcels which are deposited on the main conveyor belt 108 (FIGS. 1a and 1b) from the narrow belt 90 are deposited synchronously thereon, so that the leading edge of each parcel occupies generally the same position on each unit of conveyor length, which in the embodiment disclosed is 48 inches. The parcels on the main belt pass through the various scanning means, as previously described, and are manipulated in accordance with the various logic equations already described. Before the control means associated with the various scanning means are described, it seems appropriate to describe scanning means in detail.

Figure 6:
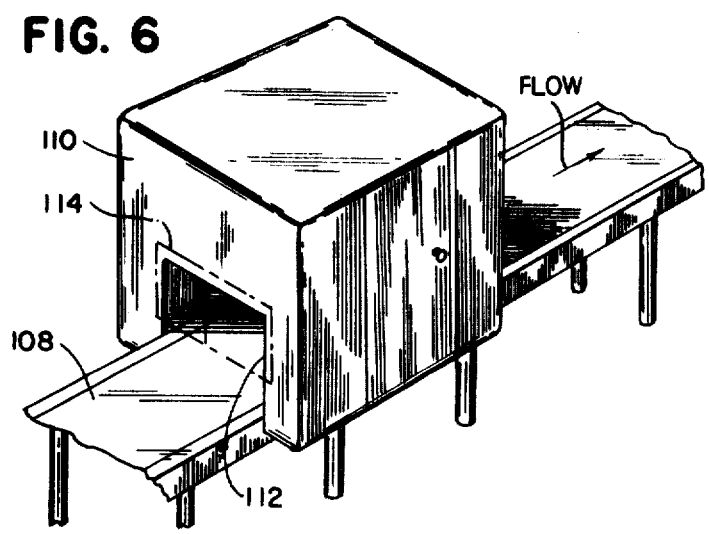

The first scanning means $S_1$ (FIG. 1a) is placed over the main belt 108, as already described in relation to FIG. 6. Because the scanning means $S_1$, $S_2$, $S_3$, and $S_4$ are all substantially alike, a detailed discussion of only the scanning means $S_1$ will be given. The scanning means $S_1$ is enclosed in the housing 110 to reduce ambient light within the housing to a very low level. Parcels enter the housing 110 through the entrance opening 112 (FIGS. 6 and 7) provided with conventional curtains 114, as previously explained. The main conveyor belt 108 is supported on a conventional support structure 276 (FIG. 7), to which legs 278 are secured to support the structure 276 and the housing 110. The housing 110 straddles the conveyor support structure 276 and is secured thereto to provide a conventional lightproof connection therebetween.

The left side of the housing 110 of the scanning means $S_1$ (as viewed in FIG. 7) has two lamps 280 and 282 positioned therein to illuminate the left side 284 of a parcel (shown in dashed outline) positioned in the housing on the main belt 108. In the embodiment shown, the lamps 280 and 282 are ultraviolet lamps (of the germicidal type) which produce a strong, localized, and quite uniform irradiation of ultraviolet energy of 2,537 Angstrom units. Each lamp (280 and 282) is 15 inches long and is adjustably supported on brackets 286 and 288, which are secured to cross members 290 and 292, respectively, which in turn are secured to the interior of the housing 110. The lamps 280 and 282 are vertically positioned, as shown also in FIG. 8, so that the scanning member 116 is positioned between them.

To illuminate the top of a parcel passing through the scanning means $S_1$, there are four 30-inch lamps 294, 296, 298, and 300 located within the housing, as shown in FIGS. 7 and 8. Each of these lamps is adjustably supported by a conventional bracket 302 at one end and another similar bracket 304 (FIG. 7) at the other end to enable the lamps to be individually focused. The brackets 302 and 304 are secured to horizontally positioned support members 306 and 308, secured to opposing inner walls of the housing 110, as best shown in FIG. 7. The lamps 294, 296, 298, and 300 are spaced as shown in FIG. 8 and are adjusted so that the elliptical reflectors 310 of each lamp focus the light therefrom on a single line 315 (FIG. 8) on the top of the main belt 108, which line 315 extends completely across the belt perpendicular to the direction of belt travel. The lamps 294, 296, 298, and 300 are positioned sufficiently high above the entrance and exit openings within the housing 110 so that they do not interfere with the passage of a parcel therethrough.

The elliptical reflectors 310 (FIG. 8) of the lamps 294, 296, 298, and 300 are designed to make the irradiation intensity from the lamps relatively uniform over the top surface of each parcel passing through the housing 110 regardless of the thickness of the particular parcel under the lamps. Because the parcels are of random size, with varying thicknesses, the top side of each parcel could conceivably lie in a horizontal plane whose location varies between being very close to the main belt 108 and being very close to said lamps. The reflectors 310 extend for the full length of their associated lamps and are similar to sections of a cylinder except that the reflectors are elliptical in cross section instead of being circular.

The scanning member 116 (shown in solid lines in FIG. 7) is positioned within the housing 110, so as to be able to scan the top side 312 and the left side 284 of a parcel passing through the housing of the scanning means $S_1$ (FIG. 1a). The scanning member 116 has a conventional mounting flange 314 secured to a vertical support 316, which is secured to the interior of the housing 110. With the flange 314 and the support 316, the scanning member 116 can be adjustably positioned to scan across the width of the main belt 108 along the direction of the line 315 (FIG. 8).

Figures 10, 11:
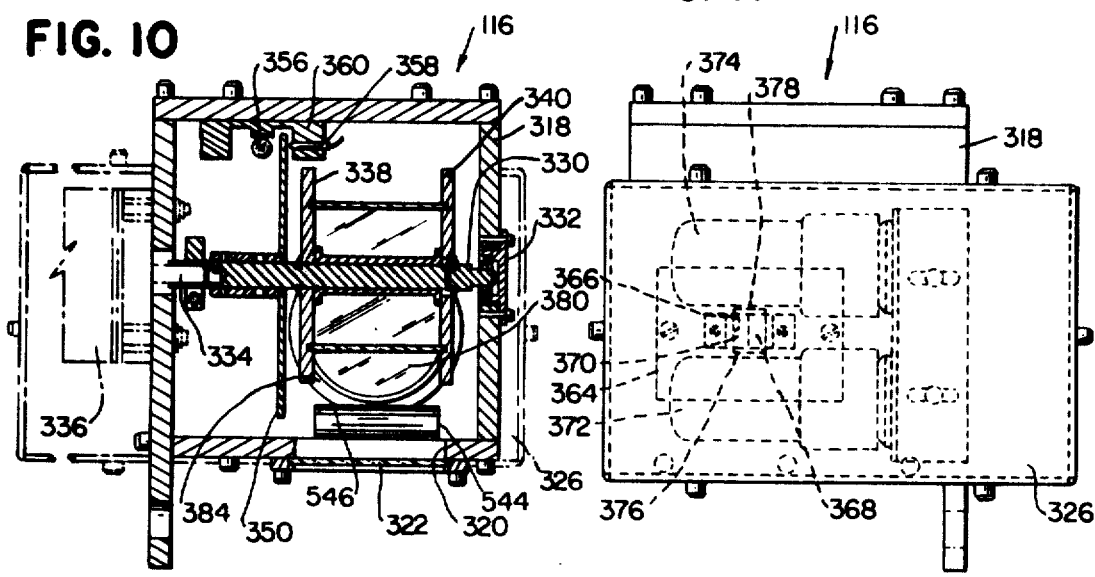
FIG. 10 is a cross-sectional view of the scanning means and is taken along the line 10-10 of FIG. 9.
FIG. 11 is an end view, in elevation, of the right end of the scanning means shown in FIG. 9.

The details of the scanning member 116 are shown principally in FIGS. 9, 10, and 11. The scanning member 116 includes a conventional box-type lightproof housing 318 having an opening 320 therein with a protective layer of clear glass 322 covering said opening to keep dust, etc., out of said housing. A tube 324, communicating with the interior of the housing 318, has one thereof secured to one side of the housing 318, and its other end is secured to a second lightproof housing 326. The second housing 326 is supported by the tube 324 and an extension 328, which is part of the housing 318. Inside the housing 318, a shaft 330 is rotatably supported at one end in a bearing 332, which is secured to one side of the housing 318. The other end of the shaft 330 is supported on and driven by a shaft 334, which extends into the housing 318 and is part of a conventional constant-speed, synchronous motor 336 (shown in dashed outline in FIG. 10), which is secured to one side of the housing 318. Two discs 338 and 340, positioned perpendicularly to the longitudinal axis of the shaft 330, are secured thereto in spaced parallel relationship, as shown in FIG. 10. The adjacent sides of the discs 338 and 340 have aligned facing recesses therein, into which planar mirrors 342, 344, 346, and 348 are positioned and secured. These mirrors are perpendicular to one another, and their reflecting surfaces are equidistantly spaced from the longitudinal axis of the shaft 330.

The particular direction of rotation given to the mirrors 342, 344, 346, and 348 of the scanning members is dependent upon the particular scanning means $S_1$, $S_2$, $S_3$, or $S_4$ in which they are located. When the entrance opening to the housing 110 is viewed as shown in FIG. 7, the direction of rotation of the mirrors of the scanning members 116 of the scanning means $S_1$, $S_3$, and $S_4$ is counterclockwise (as viewed) in FIG. 7), as illustrated by the arrow 119. The direction of rotation of the mirrors of the scanning member associated with the scanning means $S_2$ is clockwise, as viewed in FIG. 7. This scanning member is represented by the dashed outline 117. The shaft 330, to which the mirrors are secured, is rotated at 3,600 r.p.m. by the constant-speed motor 336.

A timing disc 350, secured to the shaft 330, is also rotated at 3,600 r.p.m. This disc 350 has therein two apertures 352 and 354, which are located near its periphery and are spaced apart 180° at points equidistant from the longitudinal axis of the shaft 330. A source of light 356 and a photoelectric cell 358 are mounted on a bracket 360, which is secured to the inside of the housing 318 (FIG. 10), so that light from the source 356 passes through the apertures 352 and 354 to the cell 358 when the apertures are rotated into alignment therewith. The output from the photoelectric cell 358 is used as a timing pulse in connection with control circuitry to be described later. The scanning member also has a standardization lamp 542, which will be described later.

The second housing 326 of the scanning member 116 (FIGS. 9, 10, and 11) contains an apertured plate 362, to which is attached an apertured control plate 364. The plate 364 has a rectangular aperture 366 therein, which is positioned along the longitudinal axis of the tube 324. Mounted in the housing 326 are two conventional triangular prisms 368 and 370, which are used to direct light passing through the aperture 366 to the photomultiplier tubes 372 and 374, respectively. A filter 376 is positioned between the associated prism 368 and the tube 372, and, similarly, a filter 378 is positioned between the prism 370 and the tube 374. The light is directed at the prisms 368 and 370 by a conventional double convex lens system 380, which is secured in a tubular housing 382, which is axially adjustable in the tube 324. The lens system 380 has a sufficient depth of field to accommodate the range of parcels expected on the main belt 108 (FIG. 7) and to allow for various positions of the parcels across the width of the main belt 108. In the embodiment shown, the lens system has a diameter of 52 millimeters and a focal length of 174 millimeters.

The general operation of the scanning member 116 (FIG. 7) at the scanning means $S_1$ (FIG. 1a) is as follows. As viewed in FIG. 7, the scanning member 116 is positioned in the housing 110 to strip-scan the left and top sides of a parcel positioned on the main belt 108. The indicia or mark which appears on one of the sides of a parcel is a postage stamp which is printed with a transparent overlay which contains zinc orthosilicate which is doped with magnesium ($Zn_2SiO_4$:Mn), which is a phosphorescent material. This mark, containing the phosphorescent material, when irradiated by the 2,537-Angstrom energy from the lamps 280, 282, 294, 296, 298, and 300 (FIGS. 7 and 8), gives off green light in a band about 5,250 Angstroms for several milliseconds after the irradiation from said lamps is removed. Said lamps in the housing 110 are not operated continuously but are operated intermittently. These lamps are connected to a source of 240 volts 60-cycle alternating current through current-limiting resistors, so that the lamps operate at about 170 volts. Each lamp is also conventionally shunted with a bidirectional triode semiconductor switch (like a GE SC41D Triac device), so that, at a selected point late in the AC cycle, the semiconductor switch (not shown) is triggered to short circuit the circuit to the lamp and thereby deenergize it. The purpose of the shunting of the lamps is to have a definite cutoff period for the lamps and to increase the examining time during which the lamps are deenergized. If a "phosphorescent" material or mark is present on the sides of a parcel being lighted by said lamps in the housing 110, the said material will be "charged" or "excited" during the "on" time of said lamps, and during that part of an AC cycle when said lamps are deenergized, the only light given off by the phosphorescent material will be the phosphorescence at 5,250 Angstroms. The scanning member 116 will pick up the light emitted by the phosphorescent material in addition to picking up light reflected from a parcel when the said lamps are energized. The "fluorescent" mode mentioned earlier will be discussed later in connection with FIG. 16.

As the mirrors 342, 344, 346, and 348 of the scanning member 116 rotate counterclockwise (as viewed in FIG. 7) or clockwise (as viewed in FIG. 9), any light energy reflected thereto passes through the opening 320 and is reflected off said mirrors and through said lens system 380 to the photomultiplier tubes 372 and 374. The axis of the rotating mirrors (the shaft 330, shown in FIG. 10) is positioned parallel to the travel of the main belt 108, and the center of the mirrors, as measured between the supporting discs 338 and 340 (FIG. 10) is located vertically above the scan line 315 shown in FIG. 8. In the embodiment disclosed herein, the scanning member 116 (shown in solid lines in FIG. 7) has the axis of the rotating mirrors located in a horizontal plane about 32 inches above the top of the main belt 108. Said axis is displaced laterally about 13.5 inches from the left edge of the belt 108 for scanning means $S_1$ and $S_3$. For the scanning means $S_2$ (FIGS. 1a and 12), the locating dimensions of the scanning member 116 within the housing 110 are similar, but the scanning member is positioned on the right side of the belt 108 (as viewed in FIG. 7), as previously explained. For the scanning means $S_4$, the rotating axis of the mirrors in the scanning member is located directly above the center of the main belt 108 at a distance of 45 inches therefrom. The main belt 108 has a width of 24 inches. The axes of rotation of the mirrors in the scanning members 116 in the scanning means $S_1$ to $S_4$ inclusive all lie parallel to a line extending along the direction of parcel flow on the main belt 108. The shafts 330 supporting the mirrors are rotated in the directions already described.

Figure 15:
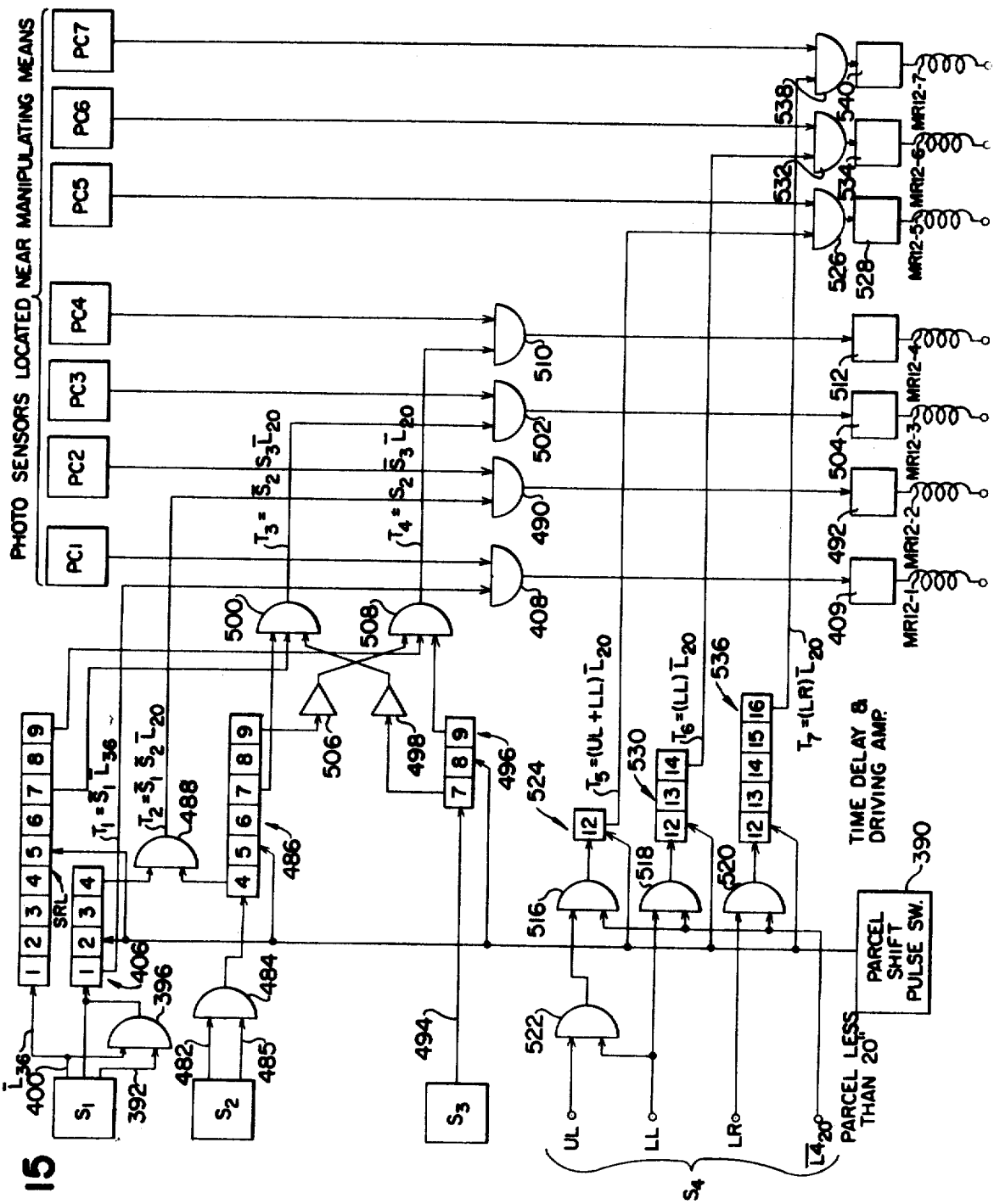
FIG. 15 is a schematic diagram, in block form, of another portion of the circuit means for controlling the apparatus of this invention, showing the means for energizing the various diverters along the length of the main conveyor belt.
Figure 16:
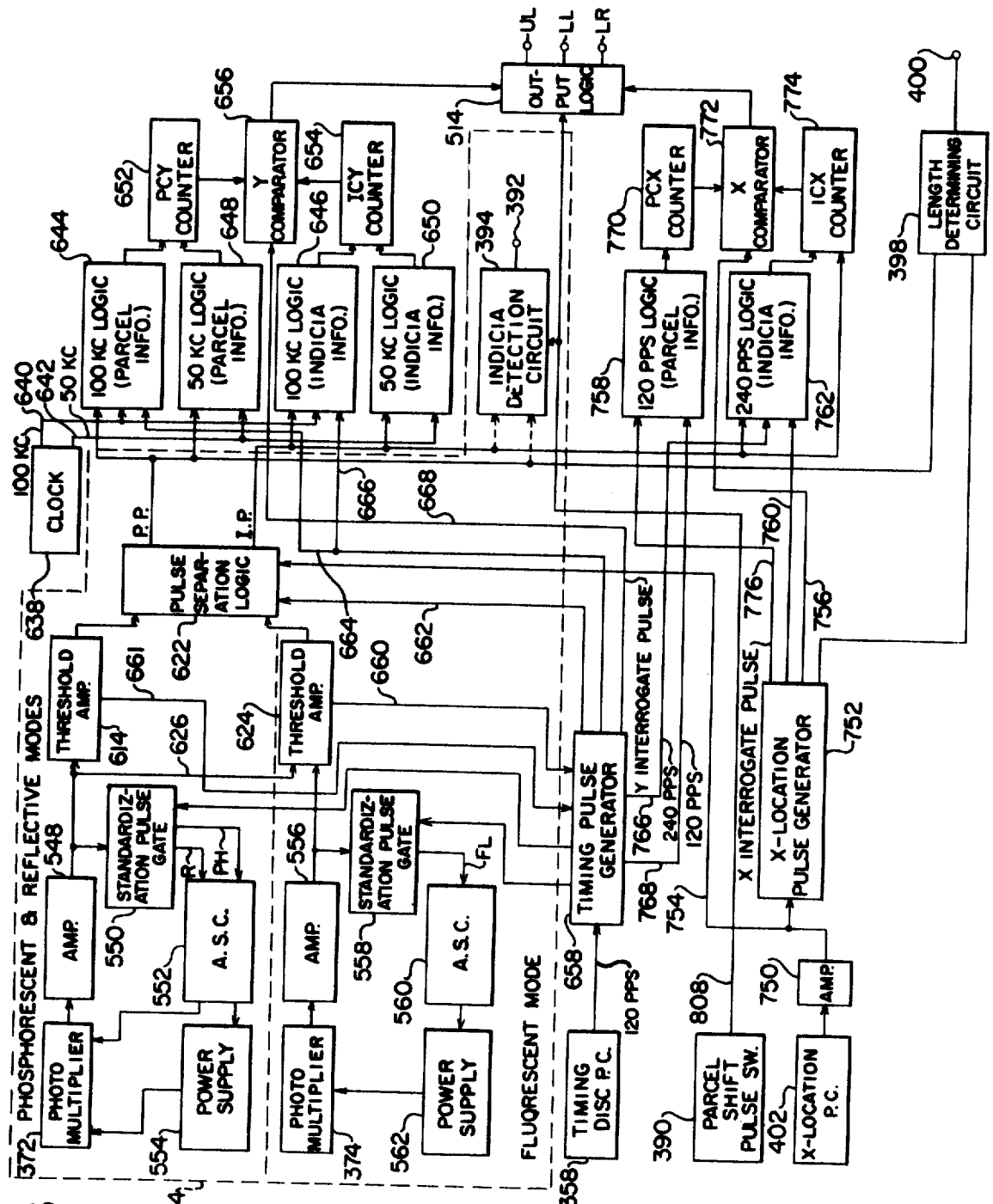
FIG. 16 is a schematic diagram, in block form, of another portion of the circuit means for controlling the apparatus of this invention, showing particularly the circuitry associated with the various scanning means.

The circuit means for controlling the handling of the parcels once they are positioned on the main belt 108 (FIGS. 1a and 1b) is shown in FIGS. 15 and 16. Although the circuitry related to each of the scanning means $S_1$ to $S_4$ inclusive is generally similar, there are some differences, and therefore it appears better to first discuss how the outputs of these scanning means are utilized to actuate the various diverters 118 associated with the manipulating means $T_1$ to $T_7$ inclusive; this aspect is shown principally in FIG. 15. That portion of the circuitry which is common to all scanning means $S_1$ to $S_4$ inclusive is generally shown within the dashed area 384 located in FIG. 16. Much of the balance of the circuit shown outside the dashed area 384 relates to the scanning means $S_4$, which is used to locate that particular quadrant in which the mark or indicia being sought is located. After a general discussion of how the outputs of the various scanning means are utilized, a detailed explanation of FIG. 16 will follow.

The operation of the control means shown in FIG. 15 as related to the first scanning means $S_1$ (FIGS. 1a and 12) is as follows. The scanning line 315 (FIG. 8) of the first scanning means $S_1$ is positioned (in the embodiment disclosed) at a distance of 48 inches from the beginning end of the main belt 108. Because information relating to a specific parcel on the belt 108 must be retained for making logical decisions with reference to the manipulating means $T_1$ to $T_7$ inclusive, positioned along the length of the main belt 108, it is convenient to think of the belt 108 as being divided in zones or modules of equal length. In the embodiment shown, the zones are each 48 inches long and are numbered X1 to X19 inclusive, with the first zone, X1, beginning at the scanning line 315 of the scanning means $S_1$. The zones are represented in FIGS. 1a and 1b by dashed lines (like the lines 386 and 388 to represent zone X3) running transversely of the main belt 108. The concept of the zones is used in connection with a shift register means to be described.

Continuing with the explanation of the control means shown in FIG. 15, assume that a parcel has passed through the scanning means $S_1$ (FIGS. 1a and 12) and a parcel shift pulse is obtained. This pulse is derived from a pair of contacts whose closing is coincident with the closing of the N.O. switch $T_1$-C (FIG. 14c), which is operatively associated with the main belt 108. This pulse, coming from the switch shown as a block 390 (FIGS. 15 and 16), occurs once every second, as it is related to the velocity of the main belt 108, which is 48 inches per second. Upon the receipt of the parcel shift pulse, information about the parcel (as to whether or not the indicia or mark sought has been detected) is derived from the output 392 of an indicia detection circuit 394 (FIG. 16) associated with the scanning means $S_1$ (FIGS. 1a and 15). The output 392 is fed into one input of an AND gate 396 (FIG. 15). Additional information about the parcel is obtained from a length-determining circuit 398 (FIG. 16), whose output 400 is also fed into the AND gate 396. When no mark is found on the sides A and B (FIG. 12) of a parcel at the scanning means $S_1$, a signal having a "1" level will occur at the output 392 (FIGS. 16 and 15); if a mark is found, a signal having a "0" level will be present. The length-determining circuit 398 (FIG. 16) is used to determine the length of the parcels passing through the various scanning means, and at the scanning means $S_1$, any parcel having a length not greater than 36 inches (that is, $\bar{L}_{36}$) will produce a signal having a "1" level at the output 400. A conventional infrared photoelectric cell 402 (FIGS. 7, 8, and 16) and a light source 404 are positioned on opposed sides of the main belt 108 very close to the plane of the belt 108, as shown. The light beam from the light source 404 to the cell 402 is parallel to and close to the scanning line 315 and is positioned slightly downstream of the scanning line. The photoelectric cell 402 is energized when the leading edge of a parcel interrupts the light beam thereto, and the output of the cell is used in connection with the length-determining circuit 398 already mentioned. If the parcel passing through the scanning means $S_1$ was so positioned that the mark sought was not detected by the scanning member 116, and if the parcel had a length not greater than 36 inches, the output of the AND gate 396 (FIG. 15) goes to a "1" level, which is fed into the first stage of a shift register means designated generally as 406. This same information is also fed into an AND gate 408. When the leading edge of the parcel leaving the scanning means $S_1$ reaches the photoelectric cell PC1 (FIGS. 1a and 15), its output goes to a "1" level, which output is fed into the partially conditioned AND gate 408, whose output goes to a "1" level to energize a conventional time delay and driving amplifier circuit 409. Upon the expiration of the delay period of the circuit 409, which is typically 0.33 second, the N.O. switch K12-1 (shown in FIG. 14d but associated with the circuit 409) closes to complete an energizing circuit to the motor relay MR12-1 and thereby energize the diverter 118 (FIG. 2) associated with the manipulating means $T_1$ (FIG. 1a), as previously explained. It should be recalled that the manipulating means $T_1$ is actuated according to the logic equation (2) shown in FIG. 13. If a parcel is greater than 36 inches long, the manipulating means $T_1$ is not energized, and the parcel simply moves along the main belt 108 and is not diverted to any of the remaining manipulating means $T_2$ to $T_7$, inclusive, because it is too long to be handled by said manipulating means. The time delay period of the circuit 409 is determined from a statistical study of the various sizes of parcels expected to be handled and is a time period which enables the parcel to travel downstream on the belt 108 and be located at a position thereon, from which position it is moved onto the manipulating means $T_1$ and $T_7$ inclusive when necessary. Of course, if the mark sought was found by the scanning member 116 of the scanning means $S_1$, the diverter 118 of the manipulating means $T_1$ would not be energized, and, accordingly, the parcel would simply proceed along the remainder of the belt 108 until it reached the next scanning means $S_2$.

The information received from the length-determining circuit 398 (FIG. 16) is also fed into the first stage 1 of a conventional shift register means designated generally as SRL (FIG. 15). As here explained, the information about a parcel passing through the scanning means $S_1$ is fed into the first stages of the shift register means SRL and 406 upon the occurrence of the parcel shift pulse from the block 390, and, at this time, the leading edge of the parcel may be considered to be positioned at the boundary between zones X1 and X2 of the main belt 108. For each subsequent pulse from the block 390, the information in the shift register means SRL and 406 is shifted forward one stage.

When a parcel on the main belt 108 (FIG. 1a) approaches the scanning means $S_2$, the following events occur. The scanning member 116 of the scanning means $S_2$ searches the top and right sides of the parcel (FIG. 12), as previously explained. The functioning of the scanning means $S_2$ is identical to that of the scanning means $S_1$, already described; however, the length-determining circuit 398 (FIG. 16) associated with it is altered to produce an output at a "1" level whenever the length of the parcel passing through the scanning means is not greater than 20 inches. The output of the length-determining circuit 398 of FIG. 16 passes over the conductor 482 (FIG. 15), which is connected to an AND gate 484. The output of the indicia detection circuit 394 (FIG. 16) associated with the scanning means $S_2$ is delivered by a conductor 485 (FIG. 15), which is connected to the AND gate 484. The length-determining circuit 398 associated with the scanning means $S_2$ is utilized to prevent parcels which are too long to be handled on the manipulating means $T_2$ from being diverted thereto. Also, because the manipulating means $T_2$ rotates any parcel diverted thereto 90° about a vertical axis, any parcel having a long dimension which is longer than 20 inches (when so rotated by the manipulating means $T_2$) would be repositioned on the main belt 108, with this long dimension oriented transversely of the main belt 108. Obviously, a parcel positioned in this manner (if too long) might be blocked at the entrance to one of the subsequent scanning means. If a parcel passing through the scanning means $S_2$ is not longer than 20 inches, and if no mark is found, a signal having a "1" level will appear at the output of the AND gate 484, which output is fed into the first stage (marked 4) of a shift register means designated generally as 486. The information from the scanning means $S_2$ is fed into the shift register means 486 by the parcel shift pulse from the block 390 at a time when the leading edge of the parcel under consideration is at the boundary between the zones X4 and X5 (FIG. 1a) of the main belt 108. The information from the stage marked 4 of the shift register means 486 is fed into one input of an AND gate 488. The other input to the AND gate 488 is connected to the fourth stage marked 4 of the shift register means 406. When the two inputs to the AND gate 488 are at a "1" level, the output thereof also goes to a "1" level to satisfy the logic equation 4 (FIG. 13) for operating the second manipulating means $T_2$. The output from the AND gate 488 is connected to one input of an AND gate 490. When the leading edge of the parcel under consideration moves into zone X5 of the main belt 108 (FIG. 1a), where the photoelectric cell PC2 is located (FIGS. 1a and 15), it actuates the photoelectric cell to produce a signal having a "1" level which is fed into the AND gate 490. The output from the AND gate 490 is fed to a conventional time delay and driving amplifier circuit 492, whose operation is identical to that of the similar circuit 409 (FIG. 15), already described; however, the circuit 492 is used to close the N.O. switch K12-2 (FIG. 14d) to complete an energizing circuit to the motor relay MR12-2 and thereby energize the diverter 118 (FIG. 2) associated with the manipulating means $T_1$ (FIG. 1a), as previously explained. Of course, if the parcel under consideration at the scanning means $S_2$ were longer than 20 inches or had the mark being sought (tagged stamp) been located on the sides being scanned, the manipulating means $T_2$ would not be activated, and the parcel would simply proceed along the length of the main belt 108 until it approached the scanning means $S_3$. It should be noted that, as a parcel moves along the main belt 108, information about it obtained from the scanning means $S_1$ and $S_2$ is shifted along in the shift register means SRL, 406, and 486.

When a parcel on the main belt 108 (FIG. 1a) reaches the scanning means $S_3$, the following events occur. The scanning member 116 of the scanning means $S_3$ searches the top and left sides of the parcel (FIG. 12), as previously explained. The functioning of the scanning means $S_3$ is identical to that of the scanning means $S_1$; however, length information about the parcel need not be determined again, as this information is already carried in the shift register means SRL. The output of the indicia detection circuit 394 (FIG. 16) associated with the scanning means $S_3$ is delivered by a conductor 494 to the first stage (numbered 7 in FIG. 15) of a conventional shift register means designated generally as 496. This same output from the stage (7) of the shift register means 496 is fed into an inverter 498, the output of which is connected to one input of a three-input AND gate 500. The length information about the parcel carried at stage 7 of the shift register means SRL is fed into a second input of the AND gate 500. The information derived from the scanning means $S_2$ about the parcel under consideration is fed to the remaining input of the AND gate 500 from the stage 7 of the shift register means 486. In the case of a parcel like the one shown in FIG. 12, the side E containing the mark would be detected by the scanning member 116 of the scanning means $S_3$, and, accordingly, an output signal having a "0" level would be present on the conductor 494 (FIG. 15). This signal from stage 7 of the shift register means 496 would be inverted to a "1" level by the inverter 498, and consequently a signal having a "1" level would appear on the output of the AND gate 500, which is connected to one input of an AND gate 502. In the parcel example given in FIG. 12, the parcel would have to be rotated by the manipulating means $T_3$, so as to rotate the side marked E to the top, as previously explained. If the parcel length were longer than 36 inches, a signal having a "0" level from stage 7 of the shift register means SRL to the AND gate 500 would inhibit its operation and thereby prevent the manipulating means $T_3$ from being actuated. As the leading edge of the parcel under consideration enters the zone X8 on the main belt 108, it actuates the photoelectric cell PC3 (FIGS. 1a and 15) and produces a signal having a "1" level which is delivered to the AND gate 502, which when combined with a "1" level signal from the AND gate 500 causes the output of the AND gate 502 to go to a "1" level. When the output of the AND gate 502 is at a "1" level, a time delay and driving amplifier circuit 504, receiving the input from the AND gate 502, is energized to close the N.O. switch K12-3 (FIG. 14d) associated therewith after the expiration of the time delay period to actuate the motor relay MR12-3 and thereby energize the diverter 118 associated with the manipulating means $T_3$, as previously explained.

If, in the parcel example given in the previous illustration, indicia was found at the scanning means $S_2$ and not found at the scanning means $S_3$ (FIG. 12), it would mean that a signal having a "0" level would be fed into the shift register means 486 and a signal having a "1" level would be fed into the shift register means 496 (FIG. 15). Under these conditions, the manipulating means $T_3$ would be actuated; however, when the parcel under consideration reached the boundary between zones X9 and X10 (FIGS. 1a and 1b), the next parcel shift pulse from the block 390 (FIG. 15) would cause the stage 9 of the shift register means 486 to output its signal having a "0" level to the input of a conventional inverter 506. The output of the inverter 506 goes to a "1" level which is fed to one input of an AND gate 508. The output of stage 9 of the shift register means 496 which is at a "1" level would also be fed to one input of the AND gate 508. If the parcel under consideration is not greater in length than 36 inches, a signal having a "1" level would also be delivered to the AND gate 508 from stage 9 of the shift register means SRL to cause the output of the AND gate 508 to go to a "1" level, which output is fed to one input of an AND gate 510. When the leading edge of the parcel under consideration reaches the photoelectric cell PC4 (FIGS. 15 and 16), located in zone X10 on the main belt 108, it actuates the cell to produce a signal having a "1" level, which signal is delivered to the remaining input of the AND gate 510.

When the output of the AND gate 510 goes to a "1" level, a time delay and driving circuit 512 is energized to close the N.O. switch K12-4 (FIG. 14d) associated therewith to actuate the motor relay MR12-4 and thereby energize the diverter 118 associated with the manipulating means $T_4$, as previously explained. The manipulating means $T_4$, operating by the logic equation 7 of FIG. 13, would then rotate the parcel under consideration counterclockwise (FIG. 12) about its own horizontal axis, as previously explained.

By the time a parcel reaches the scanning means $S_4$ (FIGS. 1a, 1b, and 12), that side of the parcel containing the indicia being sought will have so positioned as to be viewed from the top when positioned on the main belt 108. The scanning means $S_4$ is utilized to determine in which quadrant—that is, upper left (UL), lower left (LL), lower right (LR), or upper right (UR)—the indicia is located. In the embodiment shown, it is desired to orient the parcel so that the indicia sought is located in the upper right-hand quadrant when the parcel is looked at from a viewing point V located near the end of the main belt 108 (FIG. 1b).

When a parcel on the main belt 108 (FIGS. 1a and 1b), reaches the scanning means $S_4$, the following events occur. The scanning member 116 (shown only in dashed outline in FIG. 7) is positioned within the housing 110 so as to search only the top side of a parcel thereunder. The functioning of the scanning means $S_4$ is similar to that of the other scanning means; however, there are additional functions (to be described later) which the scanning means $S_4$ performs. For the present, it is sufficient to state that the output of the scanning means $S_4$ is derived from an output logic circuit 514, shown in FIG. 16. There are three outputs from the circuit 514, which are marked UL, LL AND LR in FIG. 16. These same output designations are shown as inputs to the control means shown in FIG. 15, and the designations correspond to the quadrature designations already described. Whenever the indicia sought is located in the upper right (UR) quadrant, at the scanning means $S_4$, it is in the desired orientation; therefore, it is not necessary for the manipulating means $T_5$, $T_6$, and $T_7$ to be actuated. Accordingly, only signals for the (UL), (LL), and (LR) quadrature locations are shown. A fourth signal $\overline{L4}_{20}$ is also shown as an output from the circuit 398 (FIG. 16), already described. Whenever a parcel passing through the scanning means $S_4$ has a length not greater than 20 inches, a signal having a "1" level appears at the output $\overline{L4}_{20}$ (FIGS. 16 and 15). The output $\overline{L4}_{20}$ is fed into one input of each of AND gates 516, 518, and 520, as shown in FIG. 15. The outputs (UL) and (LL) are fed into an OR gate 522, whose output is fed into the remaining input to the AND gate 516.

Whenever the indicia on a parcel passing through the scanning means $S_4$ is located in its (UL) quadrant, a signal having a "1" level appears on the output terminal (UL) of FIGS. 15 and 16, and, accordingly, the output signal of the AND gate 516 goes to a "1" level, which signal is fed into stage 12 of a conventional shift register means designated generally as 524. The same input to stage 12 is also fed into one input of an AND gate 526. When the leading edge of the parcel under consideration enters the zone X13 on the main belt 108, it actuates the photoelectric cell PC5 (FIGS. 1a and 15) and produces a signal having a "1" level which is delivered to the AND gate 526 and which signal, when combined with the signal from stage 12 of the shift register means 524, causes the output of the AND gate 526 to go to a "1" level. When the output of the AND gate 526 is at a "1" level, a time delay and driving amplifier circuit 528, connected thereto, is energized to close a N.O. switch K12-5 (FIG. 14d) associated therewith to energize the motor relay MR12-5 and thereby actuate the diverter 118 associated with the manipulating means $T_5$. Whenever a parcel passing through the scanning means $S_4$ has a length greater than 20 inches, a signal having a "0" level is placed on one input to each of the AND gates 516, 518, and 520 to inhibit the associated manipulating means $T_5$, $T_6$, and $T_7$.

Whenever the indicia on a parcel passing through the scanning means $S_4$ is located in its LL quadrant, a signal having a "1" level appears on the output terminal LL of FIGS. 16 and 15, and, accordingly, the output signal of the AND gate 518 goes to a "1" level, which signal is fed into stage 12 of a conventional shift register means designated generally as 530. The same output from the terminal LL is fed into an input to the OR gate 522 (FIG. 15), which causes the output of the AND gate 516 to go to a "1" level, which in turn actuates the manipulating means $T_5$, as just described. Because the indicia is located in the lower left quadrant of the parcel under consideration, the parcel must be subjected to two successive 90° rotations about its own vertical axis (clockwise as viewed in FIG. 12), in order to orient the parcel with the indicia being positioned in the upper right quadrant, as viewed from V in FIG. 1b. The first 90° rotation is effected by the manipulating means $T_5$; however, the second 90° rotation is delayed until the parcel under consideration enters the zone X17 (FIG. 1b) and actuates the photoelectric cell PC6 (FIGS. 1b and 15). The delay is effected by shifting the information in the shift register means 530 one stage for each parcel shift pulse from the block 390 (FIG. 15), so that, when the parcel enters the zone X15 (FIG. 1b), the signal having a "1" level carried by the shift register means 530 will be used to partially set up an AND gate 532. When the leading edge of the parcel under consideration actuates the photoelectric cell PC6 (FIGS. 1b and 15), a signal having a "1" level is placed on the second input to the AND gate 532, whose output then goes to a "1" level. When the output of the AND gate 532 goes to a "1" level, a time delay and driving amplifier circuit 534 connected thereto is energized to close the N.O. switch K12-6 (FIG. 14d) associated therewith to actuate the motor relay MR12-6 and thereby energize the diverter 118 associated with the manipulating means $T_6$, as previously explained.

Whenever the indicia on a parcel passing through the scanning means $S_4$ is located in the LR quadrant thereof, a signal having a "1" level appears on the output terminal LR of FIGS. 16 and 15, and, accordingly, the output signal of the AND gate 520 goes to a "1" level, which signal is fed into the first stage numbered 12 of a conventional shift register means designated generally as 536. Upon the occurrence of a parcel shift pulse from the block 390 (FIG. 15), which occurs as the parcel leaves zone X16 and enters zone X17 of the main belt 108 (FIG. 1a), the signal having "1" level which was fed into stage (12) of the shift register means 536 is fed into an AND gate 538 to partially condition it. When the leading edge of the parcel under consideration enters the zone X17 of the main belt 108, it actuates the photoelectric cell PC7 (FIGS. 1b and 15) and produces a signal having a "1" level which is delivered to the AND gate 538. When the "1" level signals from the shift register means 536 and the photoelectric cell PC7 are delivered to the AND gate 538, its output goes to a "1" level, and this output is delivered to a time delay and amplifier circuit 540, which is energized thereby. Energization of the circuit 540 is effective to actuate the N.O. switch K12-7 (FIG. 14d) associated therewith to energize the motor relay MR12-7 and thereby actuate the diverter 118 associated with the manipulating means, as previously described. As is apparent from FIG. 15, the parcel shift pulse from the block 390 is fed into each of the several shift register means shown thereon, so that the information fed thereto may be considered to travel with an associated parcel as it progresses along the length of the main belt 108. The scanning line 315 (FIG. 8) of each scanning means $S_1$ to $S_4$ inclusive is located at the boundary between zones X3 and X4, X6 and X7, and X11 and X12, respectively, although the representations of scanning means may be displaced somewhat on the drawing (FIGS. 1a and 1b), for ease in illustration. If a manipulating means like $T_6$ (FIG. 1b), for example, requires a length along the main belt 108 which is longer than two physical zone lengths—that is, 96 inches—an additional zone length would have to be included. The additional zone length on the main belt 108 would necessitate the inclusion of an additional stage in the affected shift register means shown in FIG. 15. As these changes are within the skill of one acquainted with the art, no further discussion is deemed necessary.

Before proceeding wit a detailed discussion of the portion of the control means shown in FIG. 16, it is appropriate to state that the scanning means operate in three different modes; namely, a "phosphorescent" mode, a "fluorescent" mode, and a "reflective" mode. The "phosphorescent" and "reflective" modes occur (on a time-sharing basis) in the photomultiplier tube 372 and associated circuitry in FIG. 16. The "fluorescent" mode occurs simultaneously with the "reflective" mode; however, the "fluorescent" mode operates in another photomultiplier tube 374 and its associated circuitry also shown in FIG. 16. The "reflective" and "fluorescent" modes occur when the lamps (like the lamp 294) are energized, while the "phosphorescent" mode occurs when said lamps are extinguished. It is convenient to begin a description of the various scanning means with a description of the scanning member 116 (FIGS. 9, 10, and 11).

There are two channels or photomultiplier tubes 372 and 374 (FIGS. 9 and 16) in the scanning member 116, which channels are used generally as follows. The tube 372 is used in the "phosphorescent" mode to detect phosphorescent indicia during a time when the ultraviolet lamps (like the lamp 294, FIGS. 7 and 8) above the parcel are extinguished. During the time that these lamps are energized, the tube 372 is also used in a "reflective" mode, which represents visible light being reflected from a parcel. During the same time that the lamps 294, etc., are energized, the other channel or photomultiplier tube 374 (FIGS. 9 and 16) is used in a "fluorescent" mode to detect any fluorescent indicia which may be present on a parcel.

Because the photomultiplier tubes 372 and 374 used with the scanning member 116 (FIGS. 9 and 10) are typically notorious for their lack of long term stability and sensitivity, it is necessary to provide for some automatic sensitivity control thereof. This is accomplished by using a standard optical signal provided by a small lamp 542, which is located in the housing 318. The lamp 542 is of the elongated variety and is placed in an enclosing, light proof shield 544 having a slot 546 therein, and is positioned in the housing so that the light passing through the slot 546 does not interfere with the light received from the parcel and indicia during the scanning time. The lamp 542 is conventionally operated on a regulated low D.C. voltage, so as to obtain a very constant light output therefrom. The standard signal from the lamp 542 (FIG. 9) which appears in the output circuit of the photomultiplier tube, like the tube 372 (FIGS. 16 and 9), is amplified in a conventional amplifier 548. The output of the amplifier 548 is fed into a conventional standardization pulse gate circuit 550, whose output is gated into an automatic sensitivity control circuit 552 (having conventional logic), which adjusts the voltage on a dynode of the photomultiplier 372 tube to keep the standard signal constant. (A conventional power supply 554 is provided.) With such an arrangement, the signal which is sampled by the scanning member 16 during the "reflective" and "phosphorescent" modes is dependent upon the light energy entering the scanning member from the parcel and the indicia, respectively. The photomultiplier tube 374 (FIGS. 16 and 9), which is used for the "fluorescent" mode, has the same type of conventional amplifier 556, standardization pulse gate circuit 558, automatic sensitivity control circuit 560, and power supply 562 associated with it as the corresponding components already described in relation to the photomultiplier tube 372. Additional details relating to the standardization signal and related matters will be discussed in relation to a timing chart to be described.

Figure 17B:
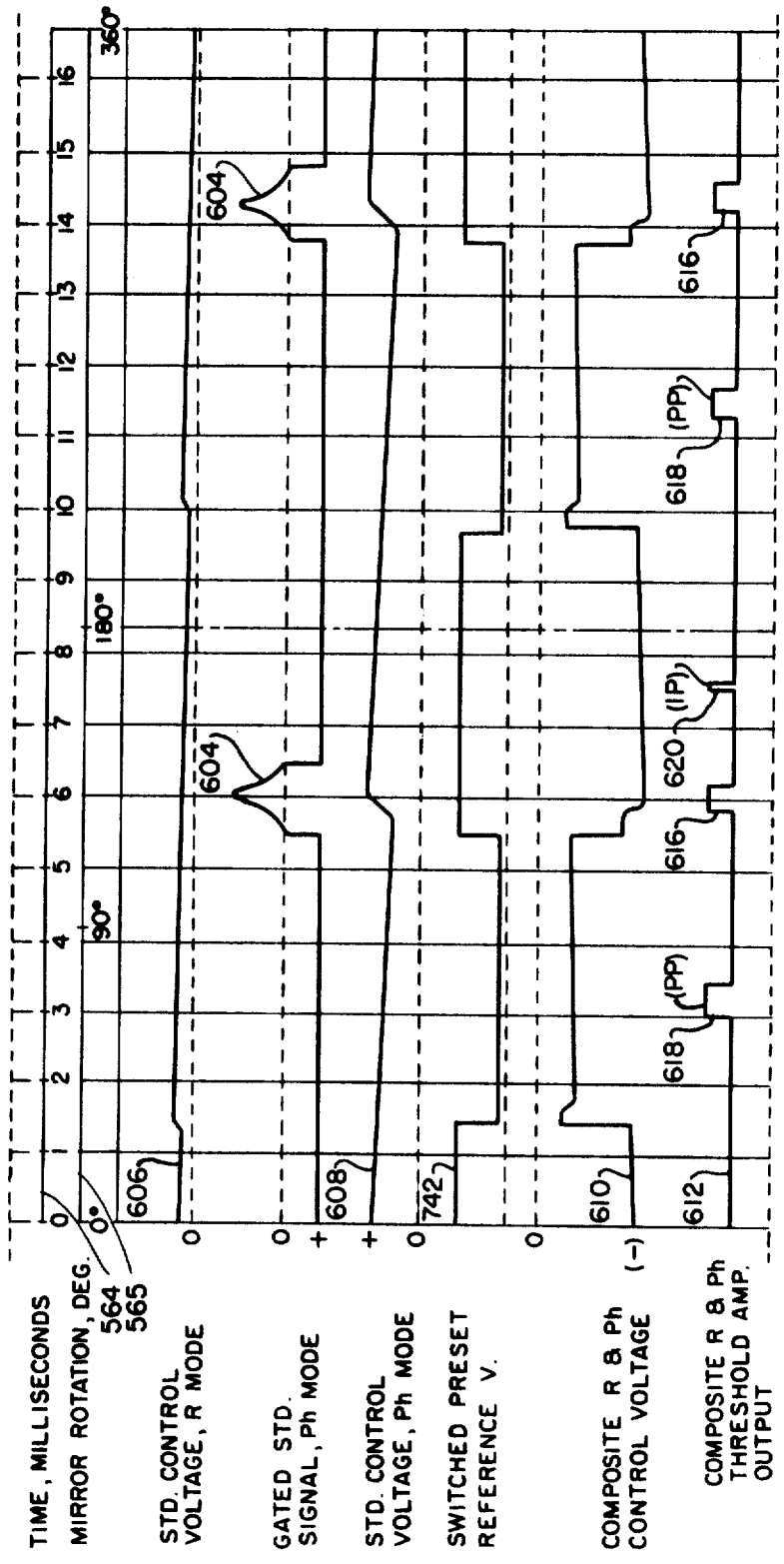

In order to understand the functioning of the control means shown in FIG. 16, it is useful to refer to a timing chart shown in FIGS. 17a to 17d inclusive. The basic time reference in the timing chart for the embodiment disclosed is related to the voltage wave for the lamps (like the lamp 294 to FIG. 7), which is obtained from a 60 c.p.s. alternating current source. The horizontal axis 564 represents time in milliseconds, and the horizontal line 565 represents degrees of rotation of the shaft 330 (FIG. 10), to which the scanning mirrors are secured. The waveform for the lamp voltage is shown as a curve 567. The voltage curve 567 does not have a strict AC waveshape, due to the essentially constant voltage characteristics of the lamps (like the lamp 294), which are gaseous-discharge devices similar to the ordinary fluorescent lamp. A phase shift also occurs due to the inductance of a transformer used to drive the lamps. As already explained, the lamps (like 294) are deenergized during a time when scanning is to be performed in the "phosphorescent" mode (hereinafter called (PH) mode). The deenergization of the lamps (like 294) occurs at a time which typically is 1.86 milliseconds before the point at which the AC voltage of the lamps changes polarity. The timing disc 350 (FIG. 10) in the scanning member 116 is adjusted so that a pulse in the photoelectric cell 358 occurs 1.86 milliseconds before a zero point in the voltage curve 567. Once the disc-350-motor relationship is set, the motor 336 (FIG. 10) driving the disc 350 is able to maintain this phase relationship with the voltage curve 567 due to the motor 336 being a synchronous motor which "locks in" a definite phase relationship with its AC driving potential. A pulse from the cell 358 (represented in FIG. 16 as a rectangle 358) is represented in FIG. 17a as signals 358 which occur twice for each complete revolution (360°) of the scanning member shaft 330, which is rotated at 3,600 r.p.m. The pulse 358 (FIG. 17a) is used to deenergize the lamps (like the lamp 294) and is shown as occurring 1.86 milliseconds before a zero point 570 in the curve 567, and the pulse 358 occurs at the rate of 120 per second. The mirrors 342, 344, 346, and 348 (FIGS. 9 and 10) of the scanning member 116 are arranged to enter the scanning field at a time which is 1.63 milliseconds before zero point like point 570 in the curve 567 (FIG. 17a). For the scanning means $S_1$ and $S_3$ (FIGS. 1a and 12), which each scan the left and top sides of a parcel, the scanning field thereof beings at the left side of the main belt 108 an progresses across the scanning line 315 (FIG. 8) to the opposite side of the belt. For the scanning means $S_2$, which scans the right and top sides of a parcel, the scanning field thereof begins at the right side of the main belt 108 and progresses across the scanning line 315 to the opposite side of the belt. For the scanning means $S_4$, which is the quadrature scanning means for scanning only the top side of a parcel, the scanning field thereof begins at an imaginary point 566 (FIG. 7) and extends across a parcel to a second imaginary point 568. The points 566 and 568 lie in an imaginary vertical plane which includes the scanning line 315. These points 566 and 568 are equidistantly spaced from the main belt 108 and are located at a distance therefrom, so that any parcel intended to be handled by the scanning means $S_4$ will lie between the points 566 and 568, which may be considered as scanning limits for the scanning member 116, shown in dashed outline (FIG. 7) directly above the main belt 108.

Referring to the timing chart (FIGS. 17a to 17d), the curve 576 shows the times during which the various scans in the different modes occur. The standardization scan from the lamp 542 in the scanning member 116 (FIG. 9) occurs during the time slots marked 578 on the curve 576, which slots represent the physical scanning limits of the scanning member 116 when scanning. The time slots marked 580 on the curve 576 represent the physical scanning limits of the scanning member 116 when scanning in the "reflective" mode (hereinafter called the R-mode), and the "fluorescent" mode (hereinafter called the F-mode). Similarly, the time slots marked 582 on the curve 576 represent the physical scanning limits of the scanning member 116 when scanning in the "phosphorescent" mode (hereinafter called the PH-mode). It should be pointed out, at this time, that, during the reflective scans (580, FIG. 17a), the photomultiplier tube 372 (FIG. 16) is used to obtain reflective information about the parcel itself, and the photomultiplier tube 374 is used to sense any fluorescent indicia present. During the PH-mode, the scan 582 is used to detect the phosphorous indicia.

The standardization scans 578 (FIG. 17a) are used in the control means shown only in block form in FIG. 16. As the individual circuits used are conventional, no detailed discussion thereof will be given. The signals from the photomultiplier tube 372 when operating in the R-mode and the PH-mode are shown on a curve 584 (FIG. 17a), with a threshold level shown as the dashed line 586. A standardization signal 588 is shown occurring in its related time slot 578. The light reflected from a parcel 579 (shown under the curve 584) during the R-mode to the tube 372 is shown as a signal 590, whose apex is slightly above the threshold line 586. A standardization scanning signal 592 occurring just prior to the PH scan is shown, and a signal 594 is also shown, indicating the presence of phosphorescent indicia on the parcel 579. The scan path of the scanning member 116 is indicated by the arrow 596, which passes through the indicia 598 on the parcel 579. Because the scan path misses part of the indicia on the parcel located at the right side of FIG. 17a, the signal 600 is shown as being weak and below the threshold line 586. The curves marked PL-1, PL-2, PL-3, and PL-4 (FIG. 17a) are conventional processing signals utilized in the control means (FIG. 16). The standardization signal 588 (FIG. 17a) for the R-mode of the tube 372 after gating and leaving the standardization pulse gate 550 (shown as R in FIG. 16) and entering the A.S.C. 552 is shown in FIG. 17a as the signal 602. The standardization pulse 592 (FIG. 17a) for the PH-mode of the tube 372 after gating and leaving the standardization pulse gate 550 (shown as PH in FIG. 16) and entering the automatic sensitivity control 552, is shown in FIG. 17b as a signal 604. The control voltage derived from the standardization signal 602 (for the R-mode) is shown as a curve 606 in FIG. 17b, and, similarly, the control voltage derived from the standardization signal 604 (for the PH-mode) is shown as a curve 608. The composite control voltage on the controlled dynode of the photomultiplier tube 372 is shown as a curve 610 in FIG. 17b. The curve 610 reflects the fact that the control voltage on the dynode of the tube 372 goes more negative during the PH-mode to provide the increased sensitivity needed when scanning for a phosphorescent signal. The curve 612 (FIG. 17b) represents the output of the threshold amplifier 610 shown in FIG. 16. This curve 612 has on it the binary signals 616 representing the standardization pulses, the signals 618 each representing a parcel-present signal, hereinafter called (P.P.), and a signal 620 representing an indicia-present (I.P.) signal. Note that the signal 600 on the curve 584, which was a weak signal below the threshold 586, does not appear on the curve 612. The output of the threshold amplifier 614 (FIG. 16) is fed into a conventional pulse separation logic circuit 622.

The photomultiplier tube 374 (FIGS. 16 and 9) is utilized to examine the object field (the parcel) during the time that the lamps (like the lamp 294) are radiating ultraviolet and visible light. The optical input to the tube 374 is spectrally limited (by the filter 378 in FIG. 9) to a narrow band of light centered on that emitted from the indicia or stamp on the parcel, thus rejecting reflected visible light and spurious emission of other wavelengths. Simultaneously with the production of a signal in the tube 374 in the F-mode, reflected light is recorded in the photomultiplier tube 372, which is operating in the R-mode. The R-mode from the tube 372 also provides a measure of the reflectance of the parcel. Because the light reflected from a parcel covers a wide band of wavelengths, and because some of this reflected energy affects the photomultiplier tube 374 (operating in the F-mode)—that is, some of the components of the reflected light have components of light falling within the passband of the filter 378 associated with the tube 374, it is necessary to provide a compensating signal when operating in the F-mode.

Figure 17D:
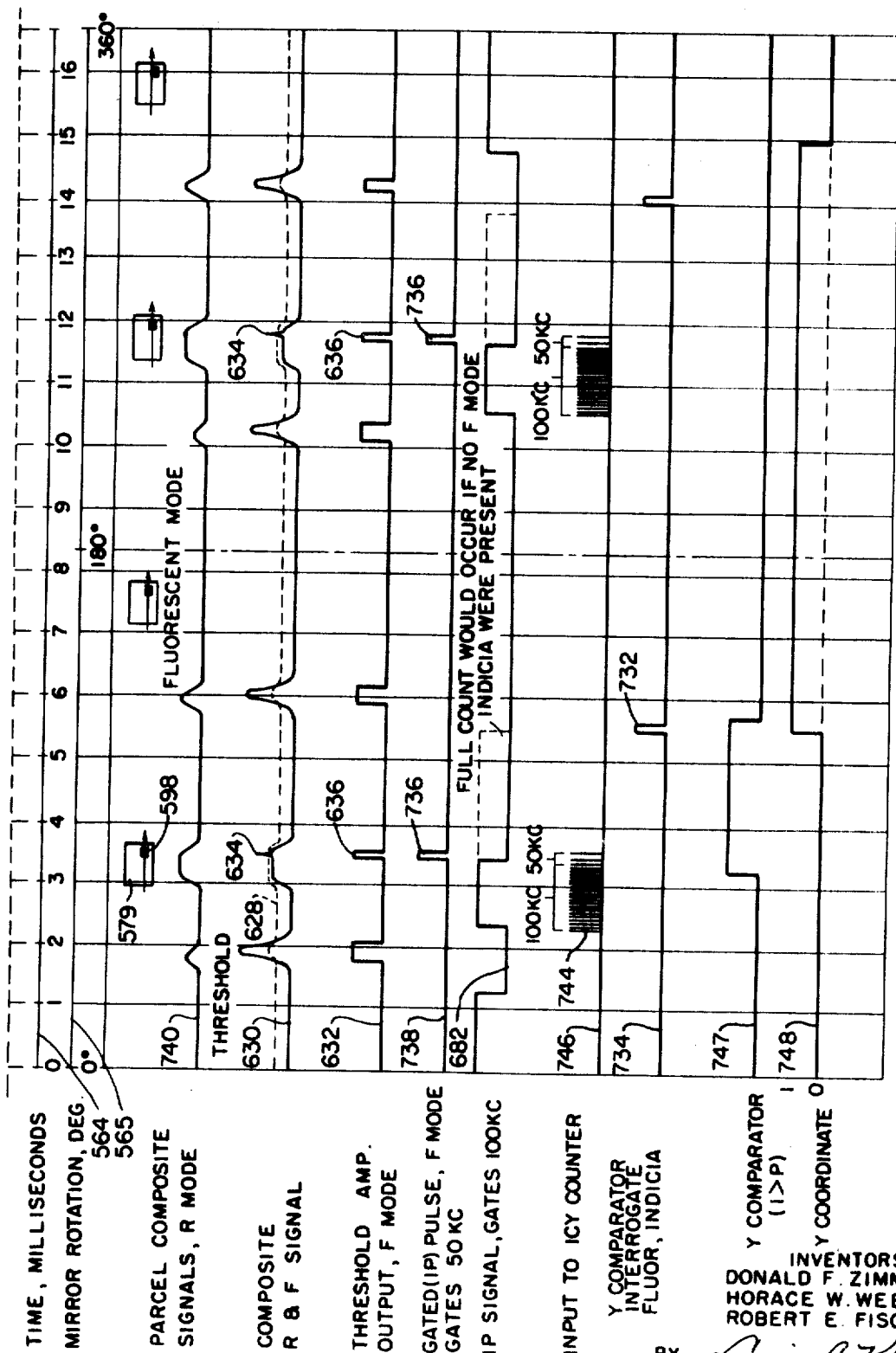

The compensating signal referred to in the previous paragraph is derived from the output of the amplifier 548 (FIG. 16), which contains the composite signals from the R-mode and the PH-mode of the photomultiplier tube 372. The output from the amplifier 548 is fed into a conventional threshold amplifier 624 by a conductor 626. The threshold of the amplifier 624 is shown as a dashed curve 628 in FIG. 17d. This curve 628 is somewhat attenuated in the amplifier 624 from that shown as curve 584 in FIG. 17a, and the curve 628 (FIG. 17d) varies directly with the output signals from the photomultiplier tube 372. During experimentation with the present invention, it was discovered that the output of the tube 374 for the F-mode varies with the reflectance of the paper to which the indicia is secured. In effect, the signal from the indicia in the F-mode is superposed on the reflected signal from the R-mode of the tube 372. Due to the variable threshold curve 628 (FIG. 17d), which compensates for the reflectances of the paper background on the parcels, the sensing of a fluorescent indicia in the presence of a high level of reflected light is accomplished. The output of the amplifier 556 (shown as a curve 630 in FIG. 17d) is also fed into the threshold amplifier 624, whose composite output is shown as a curve 632 (FIG. 17d). Following the parcel example given to explain the R-mode and the PH-mode related to the tube 372, a signal 634 (FIG. 17d) appearing above the threshold line 628 will register as an indicia pulse 636 on the curve 632. The photomultiplier tube 374 for the F-mode is also provided with a conventional automatic sensitivity control circuit 560, which operates in the same general manner as that already described in relation to the photomultiplier tube 372.

For certain of the scanning means like $S_1$, $S_2$, and $S_3$ (FIGS. 1a and 1b), it is necessary to detect only the presence or absence of the phosphorescent and fluorescent indicia. For these scanning means, the indicia pulses from the threshold amplifiers 614 and 624 (FIG. 16) are simply fed into an OR gating function within the pulse separation logic circuit 622, whose output I.P. indicates the presence or absence of indicia, as previously explained.

When the scanning means $S_4$ (FIG. 1b) is considered, additional circuit means are required to determine the quadrature location of the indicia. The additional circuit means includes a conventional clock circuit 638 (FIG. 16), producing an output 640 at 100 KC and an output 642 at 50 KC. The output 640 at 100 KC is fed into conventional gating logic 644 (FIG. 16) associated with the parcel information signals, and into conventional gating logic 646 associated with the indicia information signals. The output 642 at 50 KC is fed into conventional gating logic 648 associated with the parcel information signals and into conventional gating logic 650 associated with the indicia information signals. The outputs from the gating logic 644 and 648 are fed into conventional counter PCY 652, which counts information about the parcel in a Y direction, which in the embodiment disclosed is a direction which is across the width of the main belt 108 as at the scanning line 315. The PCY designation for the counter 652 means "parcel counter in the Y direction."

The output from the gating logic 646 and 650 is fed into a conventional ICY counter 654, which counts information about the indicia in the Y direction, as already described. The ICY designation for the counter 654 means "indicia counter in the Y direction." The outputs from the PCY counter 652 and the ICY counter 654 are fed into a conventional Y comparator circuit 656, whose output is fed into the output logic circuit 514, already mentioned.

The general operation of the ICY counter 654 (FIG. 16) is as follows. It should be recalled that the purpose of the indicia count is to determine the location of the indicia on the side of the parcel being scanned at the scanning means $S_4$. A count can be determined during both the PH-mode (from the tube 372 in FIG. 16) and the F-mode (from the tube 374). Means are provided to perform the ICY count in the counter 654 and the PCY count in the counter 652 at the proper times, which are (a) after the R-mode and the F-mode; and (b) after the PH-mode, respectively.

To accomplish the above, the F-mode signal from the threshold amplifier 624 is fed into a timing pulse generator 658 via a conductor 660. The generator 658 includes conventional logic gating circuits and has an output connected to the pulse separation logic circuitry 622 via a conductor 662. Another output from the generator 658 is connected to the 100-KC. gating logic 644 (for the parcel information) via the conductor 664 and to the 100-KC. gating logic 646 (for the indicia information) via a conductor 666. Another output 668 from the generator 658 is connected to the Y comparator 656. The functioning of the control means (FIG. 16) is best described in relation to the timing chart shown in FIGS. 17a to 17d inclusive.

When considering the counting function for the scanning means $S_4$ (FIG. 1b) to determine the location of the indicia in one of four quadrants, as previously described, the timing chart (FIGS. 17a to 17d) is helpful. At the scanning means $S_4$, the scanning member 116 (FIG. 7) thereof may be considered to start the scanning at the point 566 and then proceed to scan towards the point 568. At the moment that the scan starts at the point 566 (shown also in FIG. 17c), a 100-KC. signal will be gated by the logic 644 into the PCY counter 652 until the adjacent edge of a parcel is encountered. The adjacent edge of a parcel in the R-mode is shown as a line 670 perpendicular to the line 674. As soon as the adjacent edge of a parcel is encountered, the input to the PCY counter 562 is changed to a 50-KC. signal, which continues until the opposite edge of the parcel is reached, at which time the 50-KC. signal is stopped. The count in the counter 562 represents (in effect) a measurement to the midpoint of the parcel as measured across the width of the main belt 108 or in the Y direction. The input to the PCY counter 652 is shown on line 672 (FIG. 17c). The parcel-present pulse PP from the logic circuit 622 is shown as line 674, and the signal for gating the 100-KC. signal to the PCY counter is shown as line 676 (FIG. 17c).

When considering the PH-mode to determine the location of the indicia in a particular quadrant on one side of a parcel at the scanning means $S_4$ (FIG. 1b), the technique is the same as that already described. The line 678 (FIG. 17c) shows one signal 680, which represents the location of phosphorescent indicia discovered at 598 on the parcel 579 in FIG. 17a. The line 682 (FIG. 17c) represents a signal for gating the 100-KC. signal into the ICY counter 654, and the line 684 represents the input to the ICY counter 654. The line 686 on the line 682 (FIG. 17c) represents the start of the feeding of the 100-KC. signal into the ICY counter 654, and the signal continues until the indicia (signal 680) is reached. Upon reaching the signal 680, the 100-KC. signal is stopped, and the 50-KC. signal is gated into the ICY counter 654 until the end of the indicia is reached, at which time the 50-KC. signal is stopped with the count in the ICY counter 654, shown as 688 (FIG. 17c). The count in the ICY counter 654 represents a measurement to the center of the indicia as measured in the Y direction (across the main belt 108). The counts 690 and 692 on the line 684 (FIG. 17c) represent full 100-KC. counts in the ICY counter 654; this is due to the fact that there was no indicia from the PH-mode. The reset signals for the ICY counter 654 for the PH-mode are shown as signals 694 and 696 on the line 698 (FIG. 17c), and the reset signals for the ICY counter 654 for the F-mode are shown as signals 700 and 702 on the line 698. The reset signals for the PCY counter 652 are shown as signals 706 and 708 on the line 710. The reset signals 700, 702, 694, 696, 706, and 708 (FIG. 17c) occur in a continuous repetitive fashion. An interrogation pulse occurs selectively at the end of the scan for the F-mode (which occurs in time-phase relationship with the R-mode) or at the end of the scan for the PH-mode. The mode in which the interrogation pulse occurs depends upon whether or not a pulse has been detected in the fluorescent channel comprising the photomultiplier tube 374 (FIG. 16) and associated circuits 556 and 624. If an indicia is detected in the F-mode, a signal (like 736 on the line 738 in FIG. 17d) will occur at the output of the threshold amplifier 624 (FIG. 16). This signal will be applied, via the conductor 660, to the timing pulse generator 658 (FIG. 16), where it will, by conventional logic circuits, cause the interrogation pulse to occur at the end of the F-mode. This interrogation pulse is time-related to the basic clock pulse from the timing disc photoelectric cell 358 (FIG. 16) and is shown as 732 on line 734 in FIG. 17d.

If no indicia is detected in the F-mode, the ICY counter 654 (which will accumulate a full count as the entire field in the Y direction is scanned) will be reset by the pulse 702 on the line 698 (FIG. 17c). In the next scan, which represents a PH-mode, a count will start to accumulate in the ICY counter 654. If an indicia is detected in the PH-mode, the count in the ICY counter 654 will be terminated at a significant number representing the Y coordinate of the center of the indicia. The signal that results from the indicia (like 620 on line 612 of FIG. 17b) is applied via a conductor 661 (FIG. 16) to the timing pulse generator 658, where, as previously described, an interrogation pulse will be produced to occur at the end of the P-mode. This interrogation pulse is shown as 712 on the line 714 (FIG. 17c). In summarizing, the interrogation pulse occurs only when indicia is detected, and then only at the proper time for the detected mode (either F or PH). The reset pulses (like those on the line 698) that reset the respective counters 652 and 654 occur shortly after the associated interrogation pulses. If no indicia is detected in either the F or PH modes, there is no interrogation pulse, and both the PCY counter 652 and the ICY counter 654 are reset.

The Y comparator 656 (FIG. 16) continually receives counts as they accumulate in the PCY counter 652 and the ICY counter 654. In the example shown in FIG. 17c, the input to the PCY counter 652 (recording information about the parcel) is shown on line 672 at the lines 718, and, because there was no fluorescent indicia (as assumed), there would be no count in the ICY counter 654, and at this time, the comparator 656 output would indicate a count of P7I, which means that the count in the PCY counter is greater than the count in the ICY counter 654. To illustrate one condition of the output of the Y comparator 656, a parcel 720 (identical to the parcel 579 in FIG. 17a) is shown near the line 714 of FIG. 17c with an indicia 722 shown thereon, and with the scanning direction shown as an arrow 724. The 100-KC. count from the 100-KC. logic 646 begins to tally in the ICY counter 654 at line 686 on line 682 (FIG. 17c). Because in the parcel 720 example, the indicia 722 is located to the right (as viewed in FIG. 17c), there will be a long count (at the 100-KC. rate) fed into the ICY counter 654, before the indicia 722 is reached. When the indicia 722 is reached by scanning, the counting rate into the ICY counter 654 will change to the 50-KC. rate, as previously explained. This means that, as the center of the parcel is reached, the count in the ICY counter 654 will reach and equal the count in the PCY counter 652. The point at which the count in the ICY counter 654 exceeds that in the PCY counter 652 is shown as a line 726 on line 728 (FIG. 17c). At the end of the scan for the PH-mode, the interrogation pulse 712 on line 714 occurs, thereby recording the decision in the output logic 514 (FIG. 16). This means that the indicia is located in one of the lower quadrants; that is, either the lower left (LL) or the lower right (LR) as viewed in FIG. 12. The lower quadrants correspond to indicia locations on the right side of the parcel 579 shown in FIG. 17a or as shown in FIG. 7. Once the decision from the Y comparator is recorded in the output logic 514, the output logic 514 is inhibited from accepting any further Y-coordinate information until after the next parcel shift pulse from 390 (FIG. 16) occurs. When the parcel 722 (FIG. 17c) is examined relative to the X-coordinate logic (to be described later), its location in the left or right lower quadrant will be determined.

When the indicia on a parcel is detected in the F-mode instead of the PH-mode, described in the previous paragraph, an interrogation pulse 732 on the line 734 (FIG. 17d) is used. The pulse 732 is obtained by conventionally processing the output of the threshold amplifier 624 (from the F-mode) in the timing pulse generator 658 (FIG. 16) and delivering one output therefrom to the Y comparator 656.

The indicia-present signals, derived from the F-mode, are shown as 736 on line 738; the signals 736 are used to gate the 50-KC. signal into the ICY counter 654. The output of the amplifier 556 for the F-mode is shown on line 630 in FIG. 17d as already explained, and the line 740 (FIG. 17d) is an attenuated version of the curve 584 show in FIG. 17a (The curve 740 actually becomes the threshold level 628 shown in relation to the curve 630). The standardization signal for the F-mode is derived according to the techniques already explained relative to the PH-mode except that no switched preset reference voltage like line 742 is required. Following the parcel (579) example already given, the input into the PCY counter 652 (from line 672 in FIG. 17c) would be performed, as was done in the PH-mode. The location of the indicia in the F-mode (derived from the signal 634 on line 630 in FIG. 17d) would be derived by the 100-KC. signal which is gated into the ICY counter 654, as shown by the lines 744 on line 746. Upon the occurrence of the pulse 736, the 100-KC. signal fed into the ICY counter would be stopped, and the 50-KC. signal would be entered therein until the end of the indicia 598 on the parcel 579 is reached, at which time the 50-KC. signal is stopped. The output of the comparator 656 is shown on the line 746, and the coordinate output of the logic circuit 514 (FIG. 16) is shown as line 748, as previously explained.

Figure 18:
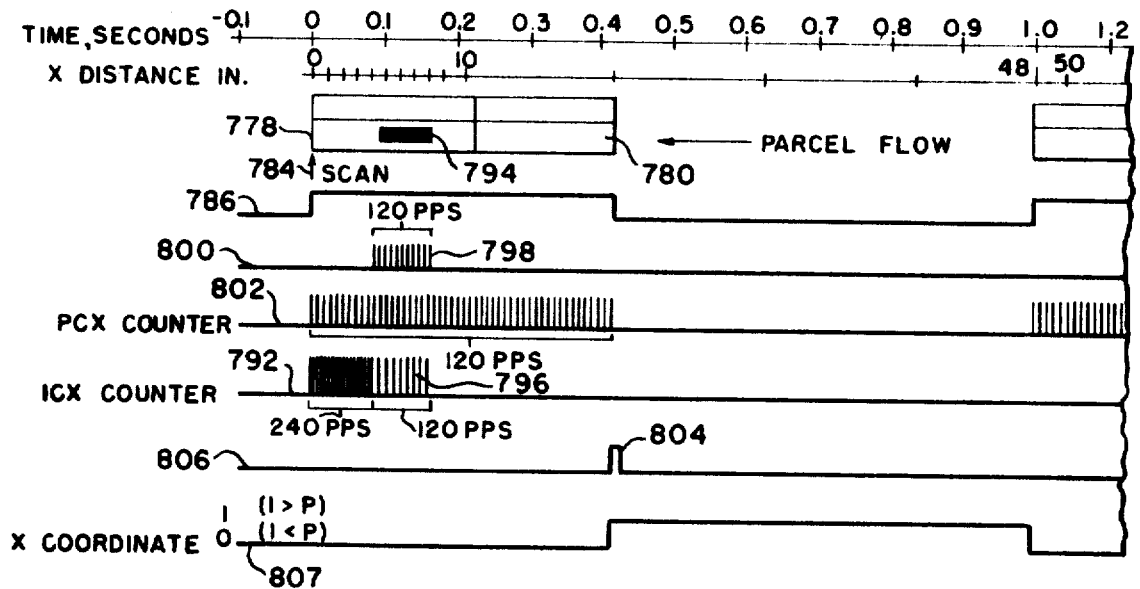
FIG. 18 is a timing chart for the X coordinate logic for the X direction, which is along the length of the main belt and perpendicular to the Y direction, and which chart is associated with the timing chart shown in FIGS. 17a to 17d inclusive.

FIGS. 16 and 18 show the control means for obtaining data in an X direction about a parcel and indicia thereon at the scanning means $S_4$ (FIGS. 1b and 12). The X direction as here used refers to the length of the parcels as measured along the length of the main belt 108, which is perpendicular to the Y direction, which is aligned wit the scanning line 315. Knowledge about the location of the indicia sought (whether on the right half or the left half of a parcel as viewed in FIG. 12) is also determined along the X direction, and, when this information is combined with that received from the Y comparator 656, the particular quadrature location determination (like UL, LL etc.) can be made at the output logic 514.

As previously stated, the photoelectric cell 402 (FIGS. 16, 7, and 8) is used to detect the leading edge of a parcel passing the scanning line 315. The output from the cell 402 is fed into a conventional threshold amplifier 750. The output from the amplifier 750 is fed into an X-location pulse generator 752 (which is composed of conventional logic circuits arranged in a conventional manner) and the pulse separation logic circuit 622 via a conductor 754. The input into the circuit 622 from the conductor 754 is utilized therein through a conventional gating function to indicate the presence of indicia at the indicia detection circuit 394 (from either the F-mode or the P-mode) when in fact a parcel is present at the scanning means. It will be recalled that the output of the circuit 394 is used in the scanning means $S_1$, $S_2$, and $S_3$, but it is not used in the scanning means $S_4$.

The X-coordinate logic is quite similar to that already described in relation to the Y-coordinate logic. One output 756 from the generator 752 (FIG. 16) is fed into conventional gating logic 758 (for parcel information), and another output 760 is fed into conventional gating logic 762 (for indicia information). A 240 p.p.s. (pulses per second) signal coming from the timing pulse generator 658 is fed into the input of the gating logic 762 over a conductor 766. A signal 120 p.p.s. coming from the generator 658 over a conductor 768 is fed into the input of the gating logic 758, as shown in FIG. 16. The output from the gating logic 758 is fed into a conventional PGX counter 770 (for counting information pulses about a parcel), and the output therefrom is fed into a conventional X comparator 772. The output from the gating logic 762 is fed into the input of an ICX counter 774. The indicia present (IP) pulses coming directly from the pulse separation logic circuit 622 are fed into the ICX counter 774 (which is conventional ) for counting information about indicia location. The IP pulses occur at the rate of 120 per second, which is the proper rate for use in locating the center of the indicia.

The output from the ICX counter 774 is fed into the X comparator 772. An X-interrogate pulse coming from the output of the X location generator 752 is fed into the X comparator 772 over a conductor 776, and the output from the X comparator 772 is fed into the output logic circuit 514.

The operation of the X-coordinate logic at the scanning means $S_4$ (with reference to FIGS. 16 and 18) is as follows. FIG. 18 has a time scale (in seconds ) across its top, as shown, and it also has a distance scale (in inches) below the time scale. The leading edge 778 of a parcel 780 is shown positioned at a zero point on the distance scale, with the parcel flow being shown by the arrow 782. The scanning direction is shown by the arrow 784 (FIG. 18), and in FIG. 7 the scanning direction proceeds from the point 566 to the point 568. When a parcel enters the scanning line, the light to the photoelectric sensor 402 (FIG. 16) is interrupted and remains interrupted as long as the parcel blocks the light thereto, as shown by the line 786 (FIG. 18). During the time that a parcel blocks the light to the sensor 402, a 120 p.p.s. signal is gated into the PCX counter 770 by the gating logic 758. The count in the PCX counter, shown on the line 802, then gives a length measurement of the parcel 780. From the beginning of the scan, a 240 p.p.s. signal, obtained from the timing pulse generator 658, is gated into the ICX counter 774 by the logic 762. This count is shown as lines 790 on line 792 (FIG. 18). When the indicia 794 FIG. 18) is reached at the scanning line 315 of the scanning means $S_4$, an indicia-present signal (IP) coming from the pulse separation logic circuit 622 is used to stop the 240 p.p.s signal being fed into the ICX counter 744, and, simultaneously, the 120 p.p.s. signal from the pulse separation logic circuit 622 is gated directly into the ICX counter 774 as long as the IP signal persists. The count in the ICX counter 774 for the time the indicia 794 is scanned is represented by the lines 796 (occurring at 120 p.p.s.) on line 792 of FIG. 18. The pulses constituting the IP signals (from either the F-mode or the PH-mode) are shown in a group 798 on line 800. The 240 p.p.s. signal is considered as the signal at the full rate, and the 120 p.p.s. signal is considered as the signal at the half-rate. Accordingly, the count in the PCX counter 770 represents a count to the midpoint of the parcel, or half the length of the parcel, and the count in the ICX counter 774 (obtained as explained) represents a count to the midpoint of the indicia. If the count in the ICX counter 774 (FIG. 16) is greater than the count in the PCX counter 770, it means that the distance to the midpoint of the indicia (as measured from the leading edge of a parcel) is greater than the distance to the midpoint of a parcel. In the example shown in FIG. 18, the count in the ICX counter 774 would be less than the count in the PCX counter, and accordingly the indicia would be interpreted by the output logic 514 to be on the "left" side, as viewed in FIG. 18, or the "downstream" side or half of a parcel. Referring to FIG. 12, the "downstream" half of a parcel would be the half including the quadrants marked UR and LR. The "upstream" half would include the quadrants marked UL and LL.

The X-interrogate pulse coming over the conductor 776 from the X-location pulse generator 752 (FIG. 16) is used to cause the X comparator 772 to output its information to the output logic 514 (FIG. 16). This X interrogate pulse occurs when the trailing edge of the parcel 780 passes by the photoelectric sensor 402 and the light beam thereto is reestablished. The X interrogation pulse 804 is shown on line 806 in FIG. 18. The PCX counter 770 and the ICX counter 774 are reset by a reset pulse derived from the interrogation pulse 804 and slightly delayed therefrom.

The length-determining circuit 398 (FIG. 16) is used to determine whether or not the parcel is longer than 20 inches to obtain the $\overline{14}_{20}$ signal associated with the scanning means $S_4$ and already described relative to FIG. 15.

The outputs from the Y comparator 656 and the X comparator 772 for scanning means $S_4$ are combined conventionally in a four-gate matrix in the output logic circuit 514 (FIG. 16) to provide the outputs shown. The output from the circuit 514 is triggered by the parcel shift pulse 390 coming over the conductor 808. The outputs shown in FIG. 16 have quadrant designations which are correlated with the quadrant designations shown in FIG. 12, which are as they would be viewed from the point V of FIG. 1b. As explained earlier, the quadrant designation (UR) (for upper right) is not shown in FIG. 16 nor utilized by the manipulating means, because, if the indicia is located in the UR QUADRANT (as viewed from the point V in FIG. 1b), the side of the parcel containing the indicia is already in the predetermined orientation and need not be manipulated by the manipulating means $T_5$, $T_6$, or $T_7$ (FIGS. 1a and 12).

What I claim is:

1. A singulating and orienting apparatus for handling a plurality of multisided items, with each item having an identifiable mark located in one quadrant on one side thereof, said apparatus comprising:
   handling means, including a moving platform, for receiving said items and for arranging them in spaced, single-file relationship on said platform,
   scanning means positioned near said platform and adapted to view selected sides of said items as they pass thereby on said platform to search for said mark; and
   item-manipulating means operative in response to said scanning means for withdrawing a selected item from said platform and for rotating it about its own vertical and horizontal axes, when necessary, and for returning said item to said platform so as to position said side containing said mark in a predetermined orientation thereon;
   said handling means comprising:
   at least one conveyor means for moving said items towards said moving platform, which has an input end and an output end;
   a pair of discs adapted to be rotated in opposite directions and to receive the items from said conveyor means; and
   a narrow belt means located downstream from said discs and upstream from said moving platform;
   said discs having driving means for rotating them in opposite directions so that an item received by said discs will tend to be centered thereon and driven onto said narrow belt means;
   said narrow belt means being aligned with said moving platform so as to enable said belt means to discharge items carried thereby onto the input end of said moving platform.

2. The apparatus as claimed in claim 1 in which said narrow belt means is sufficiently narrow for the items being handled thereby so as to support only those items which are substantially centered thereon by said discs, those items not substantially centered on said belt means having a tendency to fall thereoff.

3. The apparatus as claimed in claim 1 in which said handling means further comprises:
   means for driving said narrow belt means; and
   control means for energizing said means for driving said narrow belt means so as to transfer the items carried thereby to said input end of said moving platform in timed relationship therewith.

4. The apparatus as claimed in claim 1 in which said conveyor means further comprises deflector means positioned at the sides of said conveyor means so as to aid in positioning said items carried thereby in the center thereof and so as to deflect said items so that they come to rest on one of their more stable sides for those items which have stable and unstable sides.

5. The apparatus as claimed in claim 2 in which said handling means further comprises recirculating means for retrieving those items falling off said narrow belt means and for recycling them through said handling means.

6. The apparatus as claimed in claim 5 in which said discs have axes of rotation which are vertical, and in which said discs lie in a plane which is substantially parallel to a plane in which said narrow belt means lies,
   said handling means also including a narrow center belt means positioned between adjacent peripheries of said discs so as to assist in the transfer of items from said discs to said narrow belt means.

7. A singulating and orienting apparatus for handling a plurality of multisided items, with each item having an identifiable mark located in one quadrant on one side thereof, said apparatus comprising:
   handling means, including a moving platform, for receiving said items and for arranging them in spaced, single-file relationship on said platform,
   scanning means positioned near said platform and adapted to view selected sides of said items as they pass thereby on said platform to search for said mark; and
   item-manipulating means operative in response to said scanning means for withdrawing a selected item from said platform and for rotating it about its own vertical and horizontal axes, when necessary, and for returning said item to said platform so as to position said side containing said mark in a predetermined orientation thereon;
   said item-manipulating means including
   first and second manipulating means;
   said first manipulating means including first endless belt means and a first diverter means for transferring selected items from said moving platform to said first endless belt means;
   said first endless belt means being adapted to rotate an item transferred thereto about a horizontal axis through an angle of 90° and to return the item so transferred to said moving platform; and
   said second manipulating means including a second diverter means, and being effective to rotate an item transferred thereto by said second diverter means, about the item's own vertical axis through an angle of 90° and to return the item so transferred to said moving platform.

8. The apparatus as claimed in claim 7 in which said first endless belt means is positioned along a side of said moving platform and has an upstream roller and a downstream roller on which said first endless belt means is supported, said upstream roller being horizontally positioned and said downstream roller being vertically positioned so as to produce a 90° twist in said first endless belt means, to effect the 90° rotation of an item transferred thereto; said endless belt means having means for driving one of said upstream and downstream rollers.

9. The apparatus as claimed in claim 8 in which said downstream roller is driven and in which the speed thereof is such as to enable said first endless belt means to move an item transferred thereto at a velocity so as to reposition said last-named item on said moving platform at a location thereon which location the item would have occupied had it not been transferred therefrom.

10. The apparatus as claimed in claim 7, in which said second manipulating means comprises:
- a 90° conveyor section having an input end and an output end and means for driving said section;
- input belt means for receiving an item transferred from said moving platform and for delivering it to the input end of said conveyor section;
- said diverter means associated with said second manipulating means being adapted for transferring an item from said moving platform to said input belt means; and
- an output belt means for receiving an item from the output end of said conveyor section and returning it to said moving platform.

11. The apparatus as claimed in claim 10 in which said 90° conveyor section, input belt means, and output belt means are driven at speeds so as to enable an item transferred thereto to be repositioned on said moving platform at substantially the same location thereon which the item would have occupied had it not been transferred therefrom.

12. The apparatus as claimed in claim 7 in which said scanning means include first, second, and third scanning means positioned along the length of said moving platform,
- each of the first, second, and third scanning means having a housing which has entrance and exit openings therein through which an item may pass while being transported on said moving platform;
- said first, second, and third scanning means and said item-manipulating means being positioned along said moving platform as follows:
- said first scanning means being located near said input end of said moving platform and being adapted to scan the left and top sides of an item as viewed from a viewing point looking downstream along the moving platform and looking at the entrance openings of said first, second, and third scanning means;
- one of said first manipulating means being positioned downstream from said first scanning means and adapted to rotate an item transferred thereto in a counterclockwise direction, as viewed from said viewing point, for said angle of 90°;
- said second scanning means being positioned downstream from said last-named first manipulating means, and adapted to scan the right and top sides of an item passing therethrough as viewed from said viewing point;
- one of said second manipulating means being positioned downstream from said last-named second scanning means and adapted to rotate an item transferred thereto in a clockwise direction as viewed from said viewing point for said angle of 90°;
- said third scanning means being positioned downstream from said last-named second manipulating means and adapted to scan the left and top sides of an item passing therethrough as viewed from said viewing point;
- one of said first manipulating means being positioned downstream from said third scanning means and adapted to rotate an item transferred thereto in a clockwise direction as viewed from said viewing point for said angle of 90°; and
- one of said first manipulating means being positioned downstream from said last-named first manipulating means and adapted to rotate an item transferred thereto in a counterclockwise direction as viewed from said viewing point for said angle of 90°.

13. The apparatus as claimed in claim 12 in which said mark has matter therein which will fluoresce when subjected to light energy and which will also phosphoresce when said energy is removed therefrom,
- each said first, second, and third scanning means having detection means therein to detect said mark and to operate in fluorescent, phosphorescent, and reflective modes.

14. The apparatus as claimed in claim 13 in which each said first, second, and third scanning means has an ultraviolet energy source means therein adapted to illuminate the appropriate sides of an item to be scanned by the associated scanning means, said detection means of each of said first, second, and third scanning means having a first photosensor means for receiving light energy from said mark when operating in said fluorescent mode, and also having a second photosensor means for receiving light energy from said mark when operating in said phosphorescent mode, said energy source means being deenergized during said phosphorescent mode.

15. A singulating an orienting apparatus for handling a plurality of multisided items, with each item having an identifiable mark located in one quadrant on one side thereof, said apparatus comprising:
- handling means, including a moving platform, for receiving said items and for arranging them in spaced, single-file relationship on said platform,
- scanning means positioned near said platform and adapted to view selected sides of said items as they pass thereby on said platform to search for said mark;
- item-manipulating means operative in response to said scanning means for withdrawing a selected item from said platform and for rotating it about its own vertical and horizontal axes, when necessary, and for returning said item to said platform so as to position said side containing said mark in a predetermined orientation thereon;
- quadrature scanning means located along said platform downstream of said item-manipulating means and adapted to determine in which quadrant said mark is located; and
- second item-manipulating means operative in response to said quadrature scanning means for rotating an item, when necessary, about its vertical axis so as to orient said mark in a predetermined orientation with reference to said platform.

16. The apparatus as claimed in claim 15 in which said scanning means have detection means for operating in fluorescent, phosphorescent, and reflective modes.

17. A singulating and orienting apparatus for handling a plurality of multisided items, which each item having an identifiable mark located in a quadrant on one side thereof, said device comprising:
- first handling means for receiving said items in a random order;
- second handling means for receiving said items from said first handling means and for arranging said items in spaced single-file relationship thereon;
- an endless conveyor means having a receiving end and a discharge end, and driving means for driving said conveyor means at a constant velocity;
- control means for controlling the operation of said first and second handling means so as to discharge said items onto said receiving end of said conveyor means in timed relationship therewith;
- a plurality of scanning means positioned along the length of said conveyor means for searching for said mark on each item being transported thereon;
- at least one first manipulating means acting in response to said scanning means for withdrawing a selected item from said conveyor means and for rotating it approximately 90° about a horizontal axis of said item and for returning it to said conveyor means so as to present to a subsequent scanning means at least one side of said selected item hitherto unseen by a preceding scanning means; and at least one second manipulating means acting in response to certain of said scanning means for withdrawing a selected item from said conveyor means and for rotating it approximately 90° about a vertical axis of said item and for returning it to said conveyor means so as to present to a subsequent scanning means at least one side of said selected item hitherto unseen by a preceding scanning means;

said first and second manipulating means and said plurality of scanning means being adapted to orient each said selected item so as to place that side of the item containing the mark in a predetermined orientation on said conveyor means as the items progress downstream thereon.

18. The apparatus as claimed in claim 17 in which said plurality of scanning means include first, second, and third scanning means positioned along the length of said conveyor means, each of said first, second, and third scanning means having a housing which has entrance and exit openings therein through which an item may pass while being transported on said conveyor means, said housing having means for making it substantially lightproof as said items pass therethrough.

19. The apparatus as claimed in claim 18 in which each of said first, second, and third scanning means has detection means therein to detect said mark and to operate in fluorescent, phosphorescent, and reflective modes, said fluorescent and reflective modes occurring at the same point in time.

20. The apparatus as claimed in claim 19 in which said first, second, and third scanning means having shift register means associated therewith for transferring information about said items from said first to said second and third scanning means, and for transferring information about said items from said second to said third scanning means.

21. The apparatus as claimed in claim 20 in which said first, second, and third scanning means have means for determining the length of said items passing therethrough.

22. The apparatus as claimed in claim 17 further comprising:

quadrature scanning means located downstream from said first and second manipulating means and said plurality of scanning means, and being adapted to determine in which quadrant said mark is located; and third manipulating means acting in response to said quadrature scanning means for rotating said items about a vertical axis, when necessary, so as to orient said mark in a predetermined orientation with reference to said conveyor means.

23. The apparatus as claimed in claim 22 in which said quadrature scanning means has second detection means for operating in fluorescent, phosphorescent, and reflective modes.

24. The apparatus as claimed in claim 23 in which said second detection means has circuit means for determining the length of an item as measured along the length of said conveyor means, and for determining the width of said item as measured across the width of said conveyor means, and for determining the location of said mark relative to said length and width of said item.

25. A singulating and orienting apparatus for handling a plurality of multisided items, with each item having an identifiable mark located on one side thereof, comprising:

an endless conveyor means and means for driving it at a constant velocity;

means for delivering said items to the input end of said conveyor means in timed relationship therewith so as to position said items in spaced, predetermined locations on said conveyor means;

scanning means positioned along said conveyor means for searching for said mark;

item-manipulating means adapted to rotate said items about their own vertical and horizontal axes, when necessary, so as to position said mark in a predetermined orientation with reference to said conveyor means; and control means operatively connecting said scanning means with said item-manipulating means so as to interpret the output from said scanning means and actuate said item-manipulating means so as to effect said predetermined orientation of said mark with reference to said conveyor means;

said scanning means including at least one scanning unit comprising:

a housing positioned at said conveyor means and having entrance and exit openings through which an item may pass while being transported on said conveyor means;

light source means within said housing adapted to illuminate at least one side of an item passing therethrough; and a scanning member means positioned within said housing and adapted to scan at least said one side of said item passing therethrough;

said scanning member means comprising:

first and second light-responsive members;

rotating mirror means adapted to scan at least said one side of an item to obtain information thereon; and an optical imaging system adapted to transfer said information from said rotating mirror means to said first and second light-responsive members to produce an output therefrom;

the output from said first and second light-responsive members being used by said control means to operate in fluorescent, phosphorescent, and reflective modes.

26. The apparatus as claimed in claim 25 in which said scanning member means further comprises:

a standardization lamp adapted to provide a standardization signal to said first and second light-responsive members for said fluorescent, phosphorescent, and reflective modes; and a timing disc means associated with said rotating mirror means and adapted to provide a clocking pulse for said control means.

UNITED STATES PATENT OFFICE
CERTIFICATE OF CORRECTION

Patent No. 3,592,326          Dated July 13, 1971

Inventor(s) Donald F. Zimmerle et al.

It is certified that error appears in the above-identified patent and that said Letters Patent are hereby corrected as shown below:

Column 3, line 21, "01" should be -- #1 --.

Column 3, line 48, "02" should be -- #2 --.

Column 3, line 50, "02" should be -- #2 --.

Column 3, line 50, "01" should be -- #1 --.

Column 3, line 53, "02" should be -- #2 --.

Column 3, line 54, "02" should be -- #2 --.

Column 6, line 59, after "282" insert the following:

-- and the scanning member 117, the housing would have to be a mirror image of that shown in FIG. 7. The lamps 280 and 282 --.

Column 9, line 18, "cRB-1" should be -- CRB-1 --.

Column 9, line 68, "01" should be -- #1 --.

Column 10, line 3, "01" should be -- #1 --.

Column 10, line 11, "02" should be -- #2 --.

Column 10, line 21, "02" should be -- #2 --.

UNITED STATES PATENT OFFICE
CERTIFICATE OF CORRECTION

Patent No. 3,592,326      Dated July 13, 1971

Inventor(s)    Donald F. Zimmerle et al.     PAGE - 2

It is certified that error appears in the above-identified patent and that said Letters Patent are hereby corrected as shown below:

Column 11, line 68, "known" should be -- shown --.

Column 12, line 37, "01" should be -- #1 --.

Column 13, line 13, "01" should be -- #1 --.

Column 13, line 66, "01" should be -- #1 --.

Column 13, line 70, "01" should be -- #1 --.

Column 14, line 1, "01" should be -- #1 --.

Column 14, line 3, "02" should be -- #2 --.

Column 14, line 3, "01" should be -- #1 --.

Column 14, line 6, "01" should be -- #1 --.

Column 14, line 7, "01" should be -- #1 --.

Column 14, line 11, "01" should be -- #1 --.

Column 14, line 15, "01" should be -- #1 --.

Column 14, line 17, "02" should be -- #2 --.

Column 14, line 18, "02" should be -- #2 --.

Column 14, line 20, "02" should be -- #2 --.

Column 14, line 21, "01" should be -- #1 --.

Column 14, line 22, "01" should be -- #1 --.

UNITED STATES PATENT OFFICE
CERTIFICATE OF CORRECTION

Patent No. 3,592,326      Dated July 13, 1971

Inventor(s)   Donald F. Zimmerle et al.     PAGE - 3

It is certified that error appears in the above-identified patent and that said Letters Patent are hereby corrected as shown below:

Column 14, line 24, "01" should be -- #1 --.

Column 14, line 29, "01" should be -- #1 --.

Column 14, line 30, "01" should be -- #1 --.

Column 14, line 35, "01" should be -- #1 --.

Column 14, line 56, "01" should be -- #1 --.

Column 14, line 59, "01" should be -- #1 --.

Column 14, line 65, "01" should be -- #1 --.

Column 14, line 67, "01" should be -- #1 --.

Column 15, line 16, "01" should be -- #1 --.

Column 15, line 35, "01" should be -- #1 --.

Column 15, line 40, "01" should be -- #1 --.

UNITED STATES PATENT OFFICE
CERTIFICATE OF CORRECTION

Patent No. 3,592,326            Dated July 13, 1971

Inventor(s)    Donald F. Zimmerle et al.      PAGE - 4

It is certified that error appears in the above-identified patent and that said Letters Patent are hereby corrected as shown below:

Column 15, line 47, "pas" should be -- pass --.

Column 15, line 50, "01" should be -- #1 --.

Column 15, line 52, "01" should be -- #1 --.

Column 15, line 58, "02" should be -- #2 --.

Column 15, line 59, "01" should be -- #1 --.

Column 27, line 3, "ings" should be -- gins --.

Column 33, line 30, "$\overline{14}_{20}$" should be -- $\overline{14}_{20}$ --.

Signed and sealed this 25th day of July 1972.

(SEAL)
Attest:

EDWARD M. FLETCHER, JR.           ROBERT GOTTSCHALK
Attesting Officer                 Commissioner of Patents